(12) United States Patent
Mazarac

(10) Patent No.: US 12,371,964 B2
(45) Date of Patent: Jul. 29, 2025

(54) TUBING OBSTRUCTION REMOVAL DEVICE

(71) Applicant: Kevin Mazarac, Houma, LA (US)

(72) Inventor: Kevin Mazarac, Houma, LA (US)

( * ) Notice: Subject to any disclaimer, the term of this patent is extended or adjusted under 35 U.S.C. 154(b) by 415 days.

(21) Appl. No.: 17/639,596

(22) PCT Filed: Sep. 3, 2020

(86) PCT No.: PCT/US2020/049131
§ 371 (c)(1),
(2) Date: Mar. 2, 2022

(87) PCT Pub. No.: WO2021/046175
PCT Pub. Date: Mar. 11, 2021

(65) Prior Publication Data
US 2022/0325609 A1    Oct. 13, 2022

Related U.S. Application Data

(60) Provisional application No. 62/895,019, filed on Sep. 3, 2019.

(51) Int. Cl.
*E21B 31/00*    (2006.01)
*E21B 7/24*     (2006.01)
(Continued)

(52) U.S. Cl.
CPC ............ *E21B 31/005* (2013.01); *E21B 37/00* (2013.01); *E21B 37/02* (2013.01);
(Continued)

(58) Field of Classification Search
CPC ........ E21B 31/005; E21B 37/00; E21B 37/02; E21B 41/0078; E21B 7/24; E21B 28/00; E21B 34/10; F16K 15/063; F16K 31/0655
See application file for complete search history.

(56) References Cited

U.S. PATENT DOCUMENTS

| 4,470,464 A | * | 9/1984 | Baldenko | E21B 4/02 |
| | | | | 137/115.06 |
| 5,058,682 A | | 10/1991 | Pringle | |
| | | (Continued) | | |

OTHER PUBLICATIONS

International Search Report of PCT Appl. No. US2020/049131 issued Feb. 5, 2021. EFS file name: 20221116_17-639596_NPL_Cite1.

(Continued)

*Primary Examiner* — Tara Schimpf
*Assistant Examiner* — Neel Girish Patel
(74) *Attorney, Agent, or Firm* — John M. Hammond; Patent Innovations LLC

(57) ABSTRACT

A tubing obstruction removal device comprised of a tubular housing, a valve assembly disposed in an inlet region of the housing, and a vibratory drive disposed in the housing. The valve assembly includes a valve plate and a spring. The valve plate is in fluid communication with a fluid inlet port of the tubular housing and includes a plurality of orifices. The valve plate is oscillatable along a longitudinal axis of the tubular housing between a closed position and an open position. The spring is in contact with the valve plate and is compressible with motion of the valve plate from the closed position to the open position. The vibratory drive is comprised of a turbine in fluid communication with the valve assembly and joined to a rotatable bar asymmetric with respect to a longitudinal axis of the housing and rotatable around the longitudinal axis of the housing.

12 Claims, 13 Drawing Sheets

(51) Int. Cl.
  *E21B 28/00* (2006.01)
  *E21B 34/10* (2006.01)
  *E21B 37/00* (2006.01)
  *E21B 37/02* (2006.01)
  *E21B 41/00* (2006.01)
  *F16K 15/06* (2006.01)
  *F16K 31/06* (2006.01)

(52) U.S. Cl.
  CPC .......... *E21B 41/0078* (2013.01); *E21B 7/24* (2013.01); *E21B 28/00* (2013.01); *E21B 34/10* (2013.01); *F16K 15/063* (2013.01); *F16K 31/0655* (2013.01)

(56) References Cited

U.S. PATENT DOCUMENTS

| | | | |
|---|---|---|---|
| 5,309,405 A * | 5/1994 | Brett | B06B 1/16 367/36 |
| 5,515,922 A * | 5/1996 | Ruttley | E21B 43/003 166/301 |
| 5,575,625 A * | 11/1996 | Castel | F04F 5/42 417/178 |
| 6,279,670 B1 | 8/2001 | Eddison | |
| 8,590,637 B2 | 11/2013 | Brunet et al. | |
| 8,813,856 B1 | 8/2014 | Brunet et al. | |
| 9,145,738 B2 | 9/2015 | Mazarac | |
| 9,506,318 B1 | 11/2016 | Brunet | |
| 2012/0228033 A1 * | 9/2012 | Mazarac | E21B 7/18 175/67 |
| 2013/0306305 A1 * | 11/2013 | Bakken | E21B 31/005 166/177.6 |
| 2014/0246234 A1 * | 9/2014 | Gillis | E21B 44/00 175/24 |
| 2015/0027708 A1 * | 1/2015 | Honekamp | E21B 21/10 415/157 |
| 2015/0300153 A1 | 10/2015 | MacDonald et al. | |
| 2017/0016289 A1 * | 1/2017 | Gillis | E21B 4/10 |
| 2018/0171752 A1 * | 6/2018 | Cherry | E21B 21/103 |
| 2019/0024459 A1 | 1/2019 | Sicilian et al. | |
| 2020/0056437 A1 * | 2/2020 | Matthews | E21B 31/005 |
| 2020/0284113 A1 * | 9/2020 | McLaughlin | E21B 6/06 |
| 2021/0095539 A1 * | 4/2021 | Matthews | E21B 31/005 |
| 2021/0180431 A1 * | 6/2021 | Galindo | E21B 34/102 |
| 2021/0363847 A1 * | 11/2021 | Blakely | E21B 31/035 |

OTHER PUBLICATIONS

Written Opinion of PCT Appl. No. US2020/049131 issued Feb. 5, 2021. EFS file name: 20221116_17-639596_NPL_Cite2.

* cited by examiner

TUBING OBSTRUCTION REMOVAL DEVICE

CROSS-REFERENCE TO RELATED PATENT APPLICATIONS

This application claims the benefit of U.S. Provisional Patent Application No. 62/895,019 filed Sep. 3, 2019, the disclosure of which is incorporated herein by reference.

BACKGROUND

Technical Field

Servicing of hydrocarbon wells, such as oil and gas wells, to maintain maximum production from such wells. In particular, tools used in hydrocarbon well tubing cleanout, milling, lateral extension, paraffin cutting and fishing operations.

Background Art

In the operation of hydrocarbon wells, such as oil and gas wells, it is desirable to maintain the production of oil and/or gas at a maximum rate. However, during operation of such a well, it is necessary to interrupt the operation of the well for various reasons. A schematic diagram of an exemplary hydrocarbon well is shown in FIG. 1. It is to be understood that the well that is illustrated in FIG. 1 is not drawn to scale, particularly with respect to diameter vs. length. A typical well is much longer or deeper than illustrated relative to wellbore diameter. It is also to be understood that the structure of the well may vary from that shown in FIG. 1, with the Applicants' apparatus and method being effective in treating such wells.

Referring to FIG. 1, the oil well 10 of FIG. 1 is comprised of a casing 12 disposed in the earth 2 and includes a distal end 14 penetrating a geologic formation (not shown) containing oil, gas, and water. A surface casing 16 of a suitable material such as concrete surrounds the casing 12 to provide sealing and stability at the ground surface 4. The oil well 10 is further comprised of an outlet pipe 18 (also referred to in the art as the "Production String" or "Tubing") contained within the casing 12, and extending proximate to the distal end 14 of the casing 12.

The oil well 10 is further comprised of a reciprocating pump assembly 20, which withdraws the oil and production brine upwardly from an oil level 6 through the outlet pipe 18, and out through an exit pipe 19 in the wellhead 15, as indicated by arrow 99. Natural gas may also be present in the upper annular region 17 between the casing 12 and the outlet pipe 18. The pump assembly 20 is comprised of a pump jack (not shown), which reciprocates upwardly and downwardly. The pump jack is operatively connected to a bridle 22, which in turn is connected to a rod 24 that extends downwardly through a seal 26. In certain cases, the seal 26 may be a stuffing box type seal, and the rod 24 may be polished so as to enable smooth reciprocating motion and minimal seal wear. The rod 24 may be connected to a plunger and ball assembly 27, which is contained within a pump barrel 28, which is held in a fixed position within the casing 12 by a tubing anchor 30. In operation of the well 10, the pump jack oscillates the plunger and ball assembly 27 upwardly and downwardly as indicated by arrow 98. The plunger and ball assembly 27 includes a check valve device (not shown), which permits oil flow in the upward direction through the plunger and ball assembly 27 when the plunger and ball assembly 27 is moving downward, but prevents oil flow in the downward direction through the plunger and ball assembly 27 when the plunger and ball assembly 27 is moving upward. In that manner, the reciprocating motion of the plunger and ball assembly 27 causes lateral flow of oil from the geologic formation through perforations 13 in the casing as indicated by arrows 97 and upward flow of the oil through the outlet pipe 18 and the exit pipe 19 as indicated by arrow 99.

The objective to maintain the production of oil and/or gas at a maximum rate notwithstanding, during operation of a hydrocarbon well, it is necessary to interrupt the operation of the well for various reasons. One reason is that during operation, a problem occurs in the operation of the oil well in that paraffin deposits 8 form on the inner wall of the outlet pipe 18, and/or on the reciprocating rod 24. Such deposits restrict the flow of oil out of the well, and may also interfere with the reciprocating motion of the plunger and ball assembly 26. At some point, the accumulated paraffin deposits will so constrict the bore of the outlet pipe 18 so as to render the production rate of the well to be below a threshold at which it is economically sensible to continue operation of the well. Thus the well must either be closed, or the paraffin deposits removed, and the well placed back in service. If the well is being temporarily shut down for cleaning of the production tubing and removal of the paraffin deposits, it is desirable that the downtime for this task be as short as possible. Any interruption or restriction of production of oil from the well is very costly.

In other circumstances, the interior of the production tubing 18 may become corroded and covered with scale such as rust or other metal oxides (not shown). In certain geologic formations, mineral deposits (not shown) of calcium bromide may accumulate on the interior of the production tubing. Over time, such deposits may become sufficiently thick so as to cause many issues, such as a reduction in the inside diameter of the tubing 18, thereby reducing oil flow (as in the situation with paraffin). Additionally, safety valves (not shown) that are disposed in the production tubing may become clogged to a point at which they stop working. Scale and/or mineral deposits also make it more difficult to deploy other oilfield tools down through production tubing that has a reduced inner diameter due to the accumulation of the deposits.

In other circumstances, lengths of production tubing may be joined or sealed to each other by the use of cement. Some cement residues may be adhered to the locations where the ends of the production tubing are sealed to each other. Additionally, there may be times where a cement plug is formed in the inner bore of production tubing, so that oil and/or gas is extracted from a particular stratum of a geologic formation. Subsequently, at some point, it becomes desirable to remove the cement plug from the production tubing.

In other circumstances, a tool may be deployed down through the production tubing, and become stuck at a point where the diameter of the production tubing is reduced due to paraffin, scale, and/or mineral deposits. (Such a stuck tool is commonly referred to in the oil and gas industry as a "fish.")

The exemplary circumstances share a common problem among them: the problem of removing an obstruction from within the production tubing, when the obstruction may be located hundreds or thousands of feet below ground level. Additionally, the production tubing may curve and transition from a vertical direction to a horizontal direction, if the well has been drilled in that manner (which is commonly done for hydrofractured wells). Additionally, the physical properties of the obstruction vary, and it must be possible to deploy an obstruction removal device down the production tubing bore, remove the obstruction and restore the production tubing to satisfactory operating condition, and remove the obstruction removal device, all in as short a time as possible.

Conventional devices that are used to remove obstructions in hydrocarbon well production tubing, such as paraffin, scale, mineral deposits, or "fish," include jet pumps or other high pressure jetting devices, hydraulic motors with rotating tool bits, and jarring (impact delivering) devices. All of these devices have certain deficiencies that limit their effectiveness in removing the above-described obstructions. No single device is effective in removing all of the above-described obstructions. Additionally, some are less desirable because they are not effective at removing obstructions quickly, resulting in undesired lengthy downtime of a well.

What is needed is a device that is capable of being deployed down the inside of well production tubing and operable to remove obstructions such as paraffin, scale, mineral deposits, and fish, within the production tubing in a thorough, rapid, and cost-effective manner. There is also a need for a device that can remove obstructions from oil and gas flow tubing that extends from off-shore oil and gas well operations, and from oil and gas distribution pipelines.

SUMMARY

A tubing obstruction removal device of the present disclosure meets these needs. The device may be comprised of an elongated tubular housing; a valve assembly disposed in an inlet region of the housing and operable to receive a steady inlet flow of high velocity fluid along a longitudinal axis of the housing, and discharge intermittent high frequency pulses of high velocity fluid along the longitudinal axis of the housing; and a vibratory drive disposed in the housing and suspended by a top bearing and a bottom bearing, the vibratory drive asymmetric with respect to the longitudinal axis of the housing, rotatable within the housing, and operable to receive the intermittent high frequency pulses of high velocity fluid, and to convert the axial momentum of the intermittent high frequency pulses of high velocity fluid to unbalanced rotary motion of the vibratory drive and the elongated tubular housing. The device may be further comprised of a milling tool joined to an outlet end of the tubular housing.

In some cases, the tubing obstruction removal device may be comprised of a tubular housing, a valve assembly disposed in an inlet region of the housing, and a vibratory drive disposed in the housing. The valve assembly is comprised of a valve plate and a spring. The valve plate is in fluid communication with a fluid inlet port of the tubular housing. In operation of the device, the valve plate is oscillatable along a longitudinal axis of the tubular housing between a closed position and an open position. The spring is in contact with the valve plate and is compressible with motion of the valve plate from the closed position to the open position. The vibratory drive is comprised of a turbine in fluid communication with the valve assembly and joined to a rotatable bar asymmetric with respect to a longitudinal axis of the housing and rotatable around the longitudinal axis of the housing.

The valve plate may include a plurality of orifices therethrough. In such cases, when the valve plate is in the closed position, fluid communication is from the fluid inlet port of the tubular housing through the plurality of orifices in the valve plate, and to the turbine. Additionally, when the valve plate is in the open position, fluid communication is from the fluid inlet port of the tubular housing around the perimeter of the valve plate, and to the turbine. When the valve plate is in the closed position, fluid communication between the fluid inlet port of the tubular housing and the turbine is restricted, relative to fluid communication between the fluid inlet port of the tubular housing and the turbine when the valve plate is in the open position. When the valve plate is in the open position, the spring is in a compressed state relative to when the valve plate is in the closed position.

In some cases, the tubing obstruction removal device may include a fluid jet plate disposed in the tubular housing and in fluid communication with the valve assembly and with the turbine of the vibratory drive. The fluid jet plate may include a plurality of orifices angled toward blades of the turbine. The tubing obstruction removal device may further include a drive plate disposed in the tubular housing and in fluid communication with the valve assembly and with the fluid jet plate. The drive plate may be rotatable in the tubular housing, and the drive plate may include a plurality of orifices of a first size interspersed with a plurality of orifices of a second size. In such cases, when the device is operating, the plurality of orifices of the first size and the plurality of orifices of the second size are alternatingly in fluid communication with a plurality of orifices in the fluid jet plate. The valve assembly and drive plate are operable to cause intermittent high frequency pulses of high pressure fluid to the fluid jet plate and to the turbine. The rotatable bar, which is joined to the turbine, is operable to convert axial momentum of the intermittent high frequency pulses of high pressure fluid to unbalanced rotary motion of the vibratory drive and the elongated tubular housing.

Additionally, in accordance with the present disclosure, a method of removing an obstruction from tubing comprised of an inner bore is provided, using the obstruction removal device. The method comprises deploying the device through the tubing until the device reaches the obstruction; delivering a steady inlet flow of high velocity fluid along the longitudinal axis of the housing through the valve assembly to produce high frequency pulses of high velocity fluid along the longitudinal axis of the housing; driving the vibratory drive with the intermittent high frequency pulses of high velocity fluid, and converting the axial momentum of the intermittent high frequency pulses of high velocity fluid to unbalanced rotary motion of the vibratory drive and the elongated tubular housing; and impacting the tubular housing on the obstruction within the tubing and causing the disintegration and removal of the obstruction from the inner bore of the tubing.

BRIEF DESCRIPTION OF THE DRAWINGS

The present disclosure will be provided with reference to the following drawings, in which like numerals refer to like elements, and in which.

Figure 1:
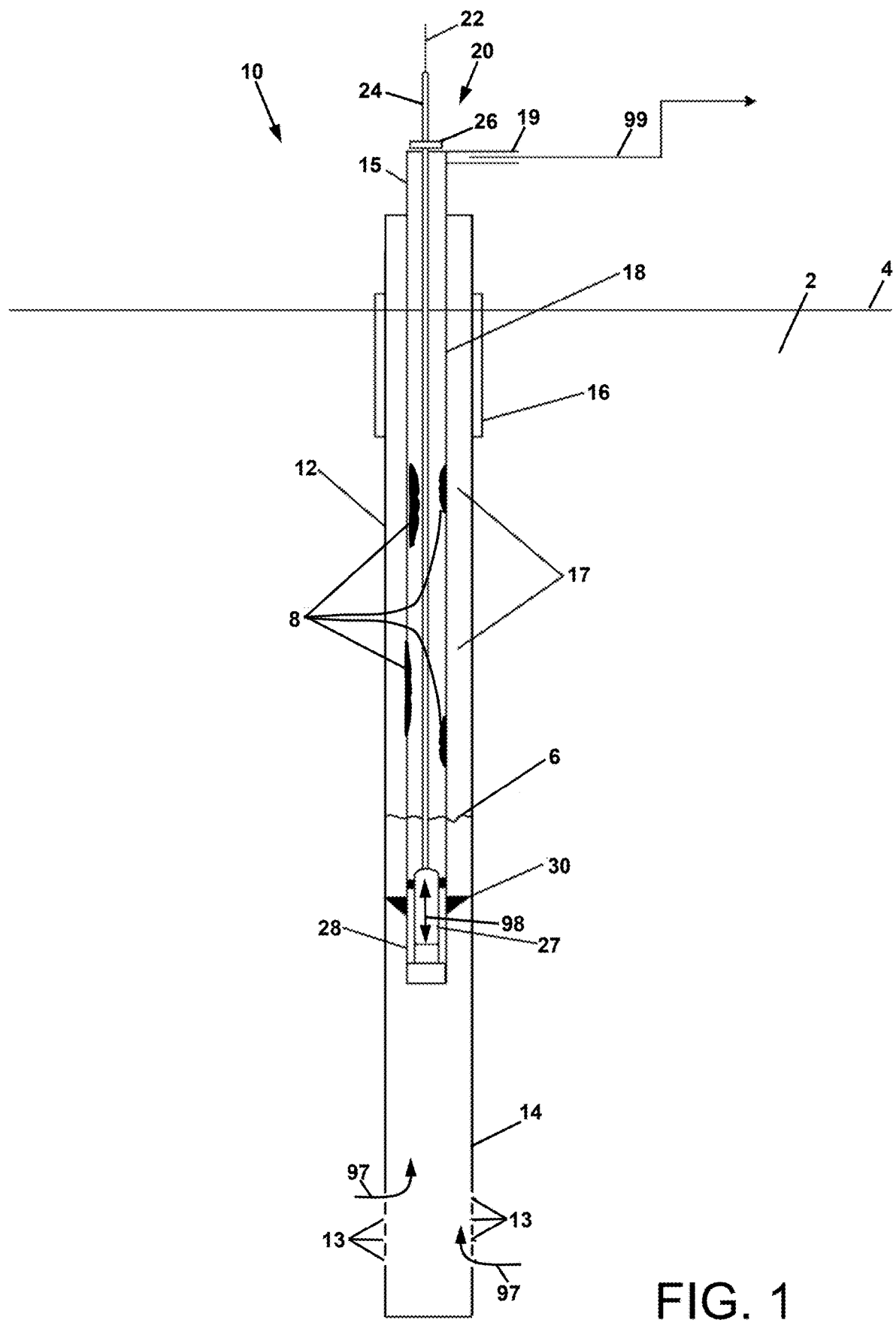
FIG. 1 is a schematic diagram of an exemplary hydrocarbon production well.

The device of the present disclosure will be described in connection with certain preferred embodiments. However, it is to be understood that there is no intent to limit the invention to the embodiments described. On the contrary, the intent is to cover all alternatives, modifications, and equivalents as may be included within the spirit and scope as defined by the appended claims.

BEST MODE FOR CARRYING OUT THE INVENTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, the present invention is described in the context of its use as a device for removal of obstructions in the production tubing of a hydrocarbon well. However, it is not to be construed as being limited only to use in hydrocarbon wells, offshore hydrocarbon well flow tubing, and oil and gas pipelines. The invention is adaptable to any use in which it is desirable to remove obstructions that are located deep inside a tube or elongated cavity. Additionally, this disclosure may identify certain components with the adjectives "top," "upper," "bottom," "lower," "left," "right," etc. These adjectives are provided in the context of use of the device as deployed down the production tubing of a hydrocarbon well, and in the context of the orientation of the drawings. This disclosure is not to be construed as limiting the device to use in a particular spatial orientation. The instant obstruction removal device may be used in orientations other than those shown and described herein.

In describing the present invention, a variety of terms are used in the description. As used herein, the term production tubing and the term "wellbore" are used interchangeably.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

The term "providing", such as for "providing a housing" and the like, when recited in the claims, is not intended to require any particular delivery or receipt of the provided item. Rather, the term "providing" is merely used to recite items that will be referred to in subsequent elements of the claim(s), for purposes of clarity and ease of readability.

In this disclosure, references are made to a "vibratory" drive and a "sonic" drive. The terms are used interchangeably, and make reference to a drive that can cause oscillatory motion of the drive, and the tubing obstruction removal device. The term "conic" as used herein is not limited to frequencies of audible sound. The vibratory frequencies of the tool disclosed herein may include sonic, subsonic, and ultrasonic frequencies.

Figure 2:
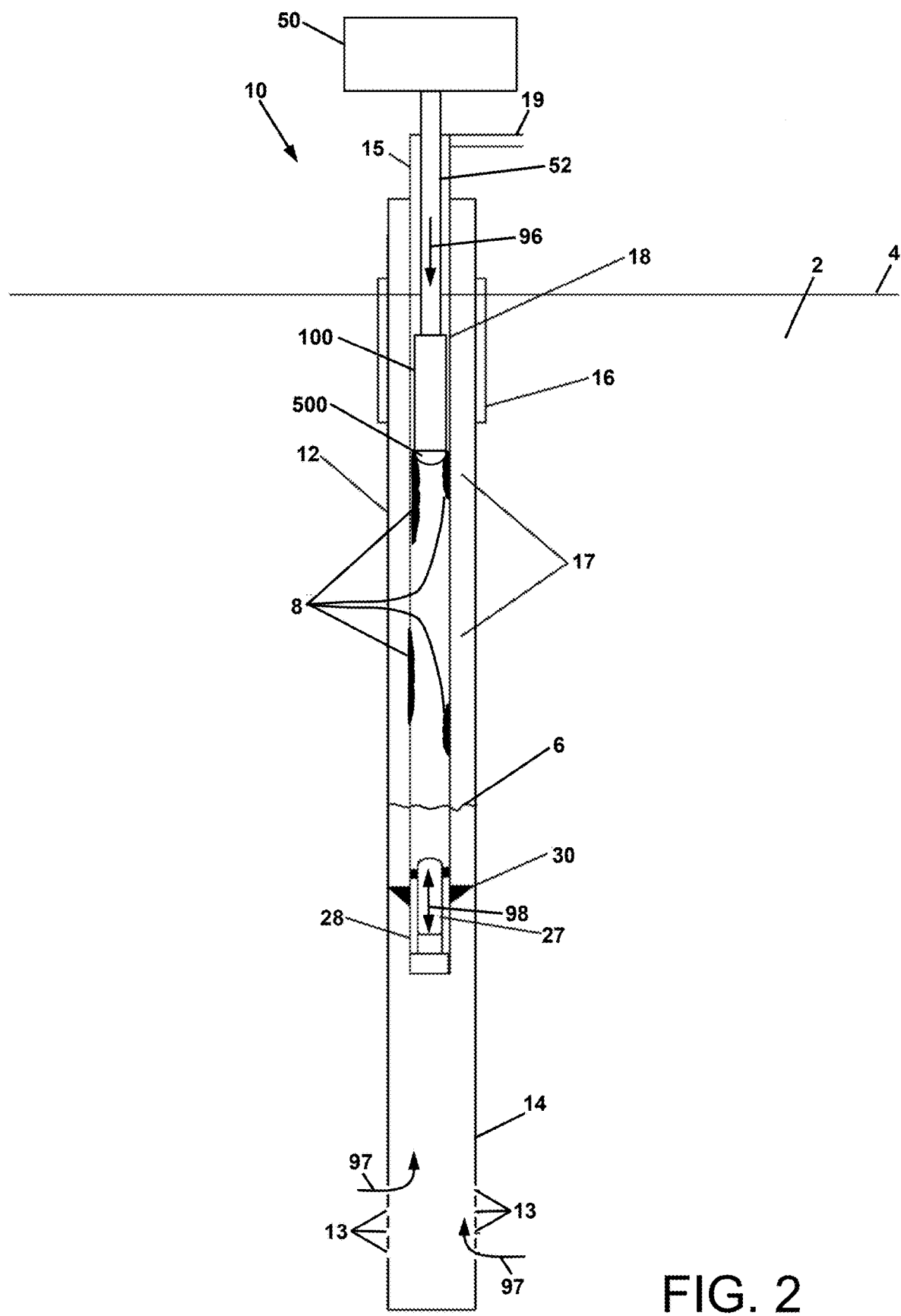
FIG. 2 is a schematic diagram of the deployment of the tubing obstruction removal device of the present disclosure in the exemplary hydrocarbon production well of FIG. 1.
Figure 3:
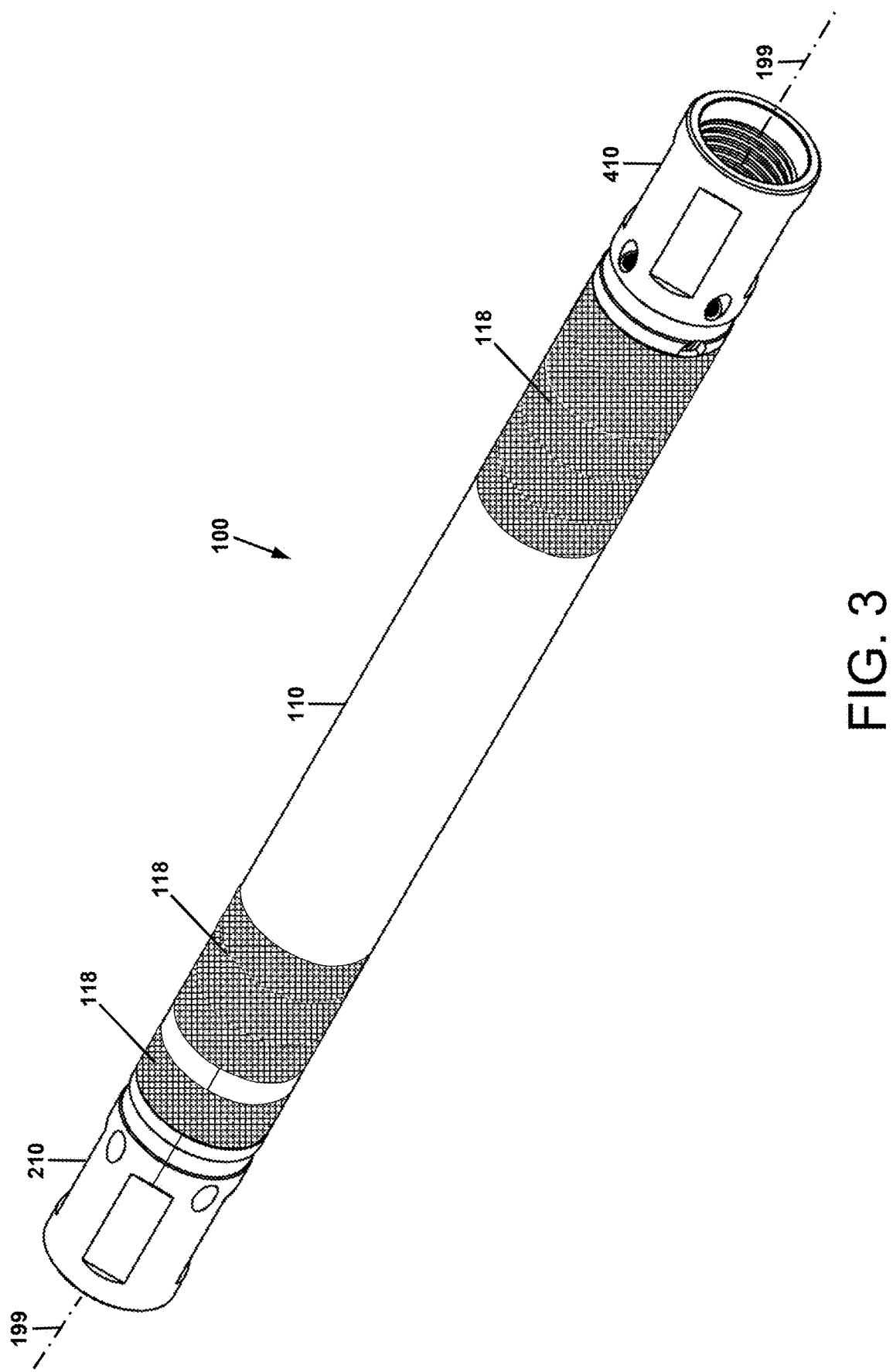
FIG. 3 is a perspective view of a tubing obstruction removal device of the present disclosure.
Figure 4:
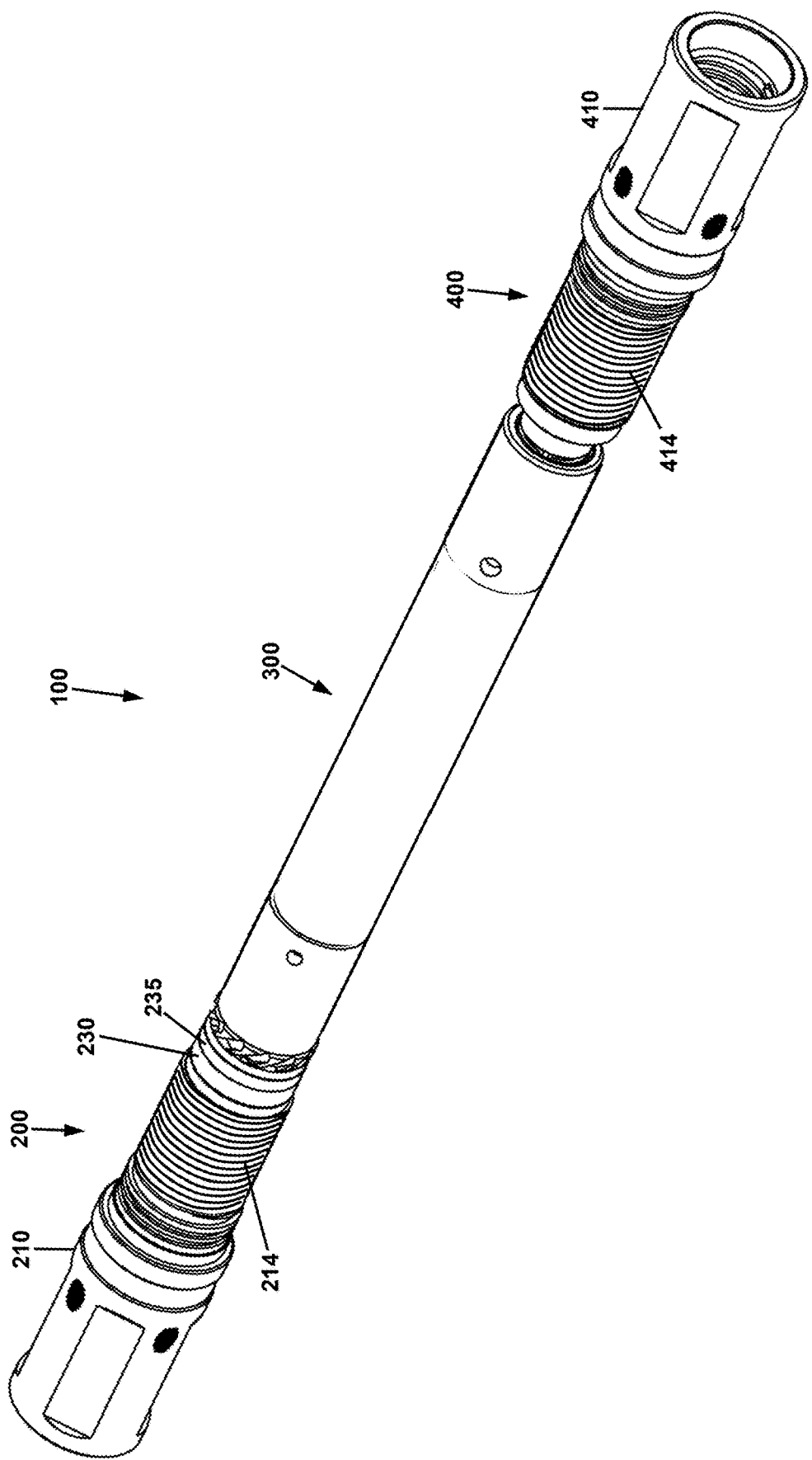
FIG. 4 is a perspective view of the tubing obstruction removal device of FIG. 3, shown with an outer cover removed.
Figure 5:
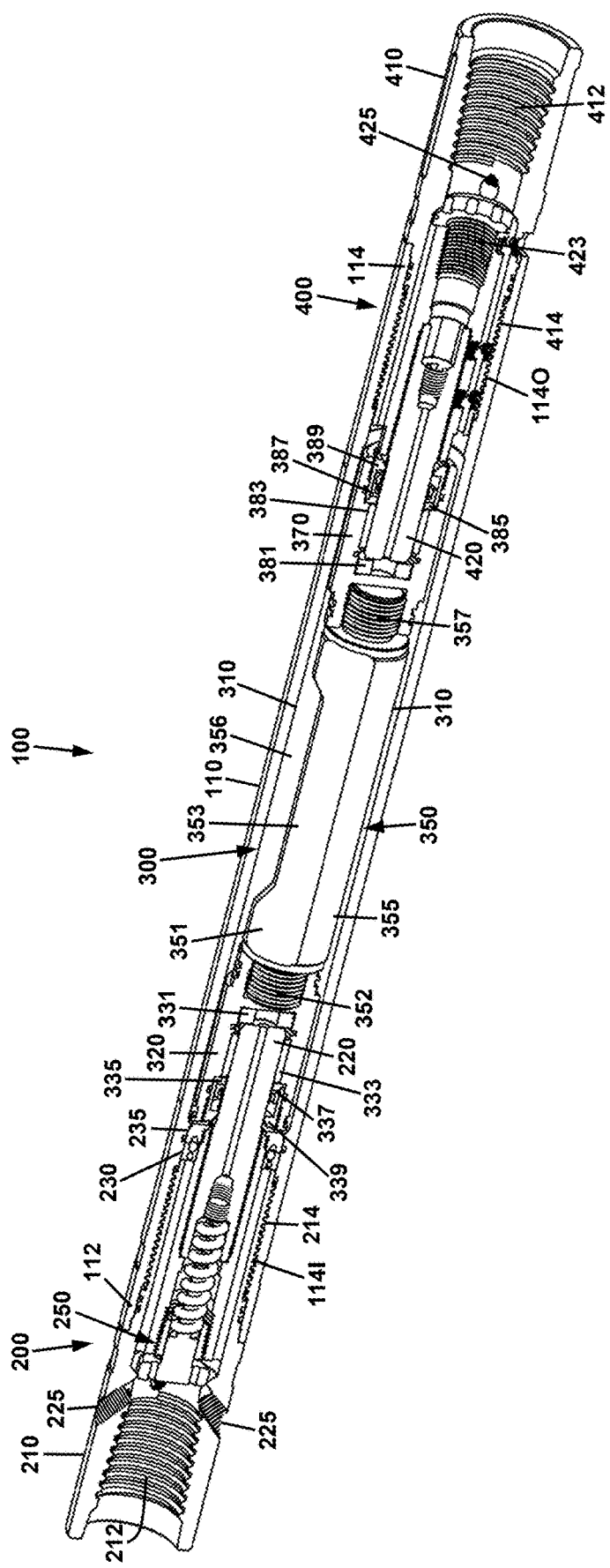
FIG. 5 is a cutaway perspective view of the tubing obstruction removal device of FIG. 3.

FIG. 2 is a schematic diagram of the deployment of a tubing obstruction removal device 100 of the present disclosure in the exemplary hydrocarbon production well 10 of FIG. 1. To begin the obstruction removal method, at ground level 4, the tubing removal device 100 is coupled to a tubing feed unit 50 by feed tubing 52, which is used to deploy the removal device 100 down the inner bore of the production well tubing 18, as indicated by downward arrow 96. Referring also to FIG. 5, the coupling of the device 100 to the feed tubing 52 may be done by engaging the inlet threads 212 provided on the inlet housing 210 (also referred to as the top housing sub 210) with corresponding threads (not shown) on the feed tubing 52. Other coupling arrangements are contemplated.

The feed tubing 52 is sufficiently rigid so as to be able to apply an axial force upon the device 100, thereby driving it along the inner bore of the production tubing 18. However, the feed tubing 52 is also sufficiently flexible so as to be able to conform to a bend in the production tubing 18, in the situation where the hydrocarbon well 10 includes a horizontally drilled section, such as is common with hydrofractured wells. Advantageously, the ability of the tubing removal device 100 to be coupled to such feed tubing 52 and deployed down the production tubing 18 enables the removal of obstructions without removing the production tubing 18 from the well 10, which further eliminates the need to mobilize and set up a service rig to remove and replace the production tubing 18. The use of such feed tubing 52 also enables the obstruction removal device 100 to be remotely deployed long distances down well production tubing 18, or along well flow tubing or within oil and gas pipelines above or below ground level 4.

In certain cases, the tubing feed unit 50 may feed tubing 52 by unwinding it from a coil of tubing (not shown). At the point of entry into the inner bore of the production tubing, the unwinding device drives the tubing 52 through a straightening die (a.k.a. injector head, not shown), so that the tubing, which is made of a malleable metal alloy such as a suitable alloy of carbon steel, is straightened and aligned with the inner bore of the production tubing 18. Other means of deploying the feed tubing 52, such as in long sections with threaded ends for coupling to each other, are contemplated. Suitable types of feed tubing 18 include but are not limited to seamed or seamless tubing, jointed pipe, production tubing, snubbing pipe, coil tubing, and casing.

When the obstruction removal device 100 has reached the obstruction(s) 8 in the production tubing 18, a steady inlet flow of high velocity fluid is delivered down through the feed tubing 52, and along the longitudinal axis 199 of the inlet housing 210 through a valve assembly 250 of the device, thereby producing intermittent high frequency pulses of high velocity fluid along the longitudinal axis 199 of the device 100. The pulses of fluid drive a sonic drive assembly 300, which converts the axial momentum of the intermittent high frequency pulses of high velocity fluid to unbalanced rotary motion in the sonic drive assembly 300. The unbalanced rotary motion causes impacting of the exterior of the device 100 (and optionally, a milling tool 500 as shown in FIG. 2 attached to the housing 410) on the obstruction(s) 8 within the tubing 18. Such impacting causes the disintegration and removal of the obstruction(s) 8 from the inner bore of the tubing 18.

The obstruction removal device 100 and related methods of removing an obstruction 8 from wellbore tubing of will now be described in detail, with reference to FIGS. 3-10.

Turning first to FIGS. 3-6, the obstruction removal device 100 is comprised of an inlet subassembly 200, which is operatively coupled to a sonic drive subassembly 300, which in turn is operatively coupled to an outlet subassembly 400. When a high pressure fluid is delivered into the device 100, the coupled subassemblies 200, 300, and 400 coact to cause high energy oscillations of the device 100 within the production tubing 18 and to cause impacts of the device 100 (and optionally a milling tool 500 joined thereto) on the inner bore of the production tubing 18, thereby removing obstructions 8 from the inner bore of the production tubing 18.

The subassemblies 200, 300, and 400 will now be described in individually in detail, followed by a description of their assembly to form the overall device 100, and followed by a description of the delivery and pathway of fluid through the device 100 to cause the high energy oscillations of the device 100 within the production tubing 18, thereby causing obstruction removal from the production tubing 18.

Figure 6:
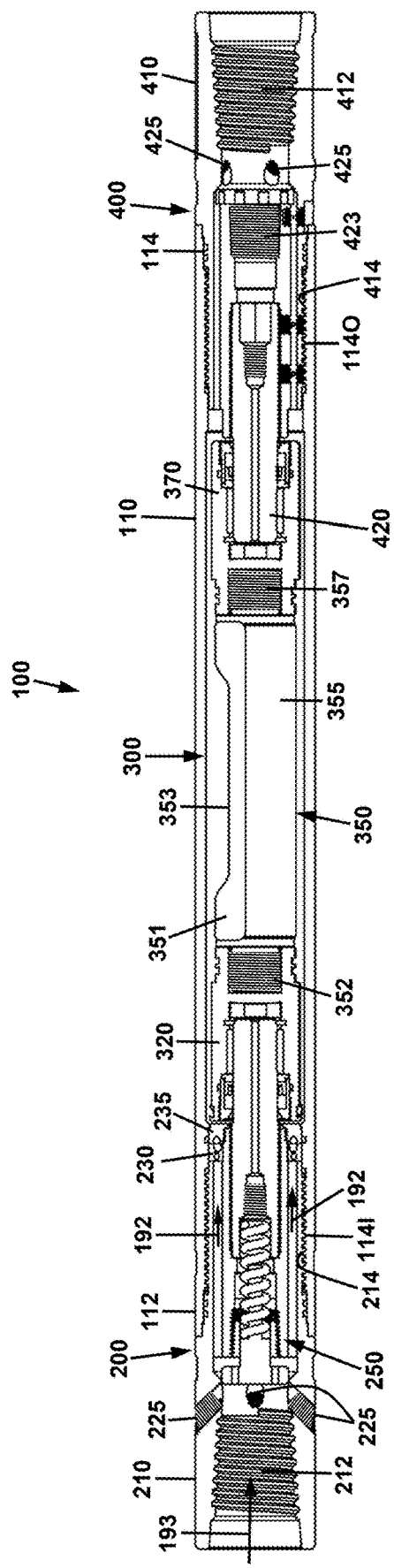
FIG. 6 is a side cross-sectional view of the tubing obstruction removal device of FIG. 3.
Figure 7A:
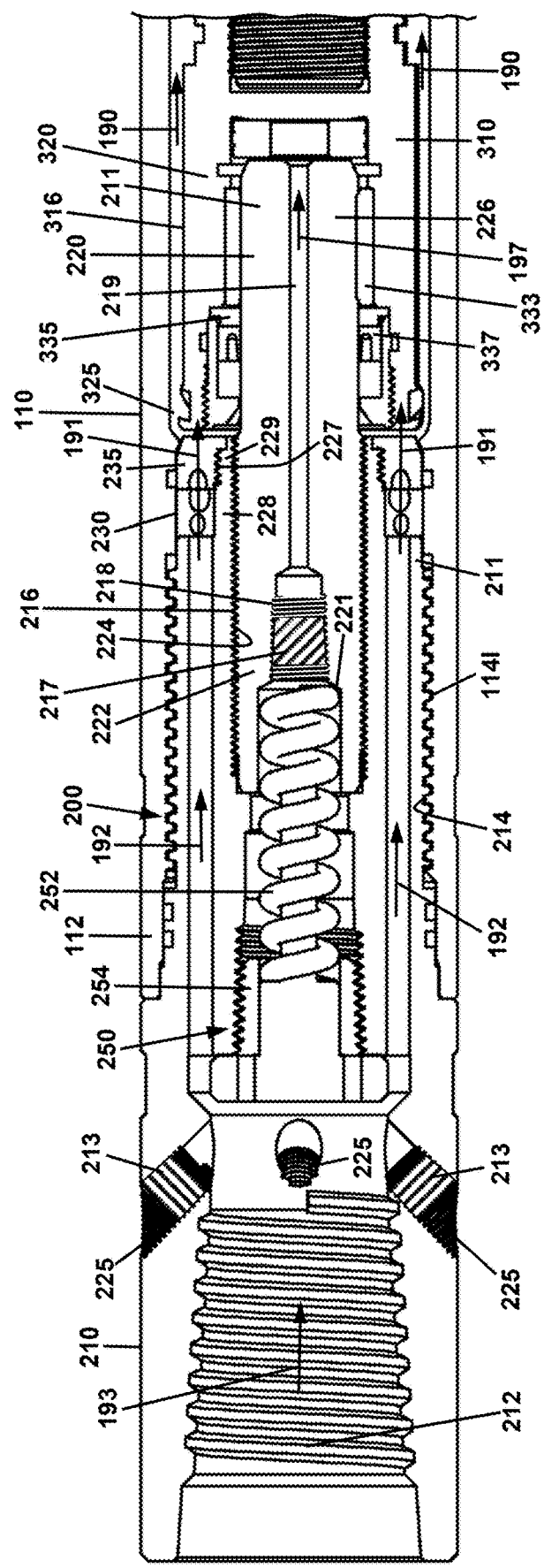
FIGS. 7A, 7B, and 7C are detailed cross-sectional views of the cross-sectional view of FIG. 6, showing respective inlet, central, and outlet regions of the device, and fluid flows therethrough.

Referring to FIGS. 5, 6, and 7A, the inlet subassembly 200 is comprised of the top housing sub or inlet housing 210, a pulsation valve assembly 250, and the inlet or upper bearing shaft 220. The inlet housing 210 is comprised of an inlet port which may include inlet threads 212. As described previously, the inlet threads 212 may be engaged with feed tubing 52 (FIGS. 2, 9A, 9B) for deployment of the device 100 down a well bore.

The inlet housing 210 is further comprised of external threaded region 214, which is engaged with corresponding inlet threads 1141 of elongated tubular housing 110 when the device 100 is fully assembled. The inlet housing 210 is further comprised of an internal threaded region 216 which is engaged with corresponding threads 224 on the proximal end 222 of the upper bearing shaft 220. The distal end 226 of the upper bearing shaft 220 extends outwardly from the distal end 211 of the inlet housing 210 in a cantilevered arrangement so as to be able to engage with and support a bearing housing top sub 320 of the sonic drive subassembly 300 as will be explained subsequently.

A variable frequency drive plate 230 is disposed on a shoulder 228 formed on a distal end 229 of the inlet housing 210. A fluid jet propulsion plate 235 is engaged with threads 227 on the distal end 229 of the inlet housing 210. When the fluid jet propulsion plate 235 is installed on the inlet housing 210, it is contiguous with and holds the variable frequency drive plate 230 in place on the inlet housing 210. Additionally, the variable frequency drive plate 230 includes ports of a first size and ports of a second size that are in fluid communication with ports in the fluid jet propulsion plate 235 as will be explained subsequently.

Figure 7B:
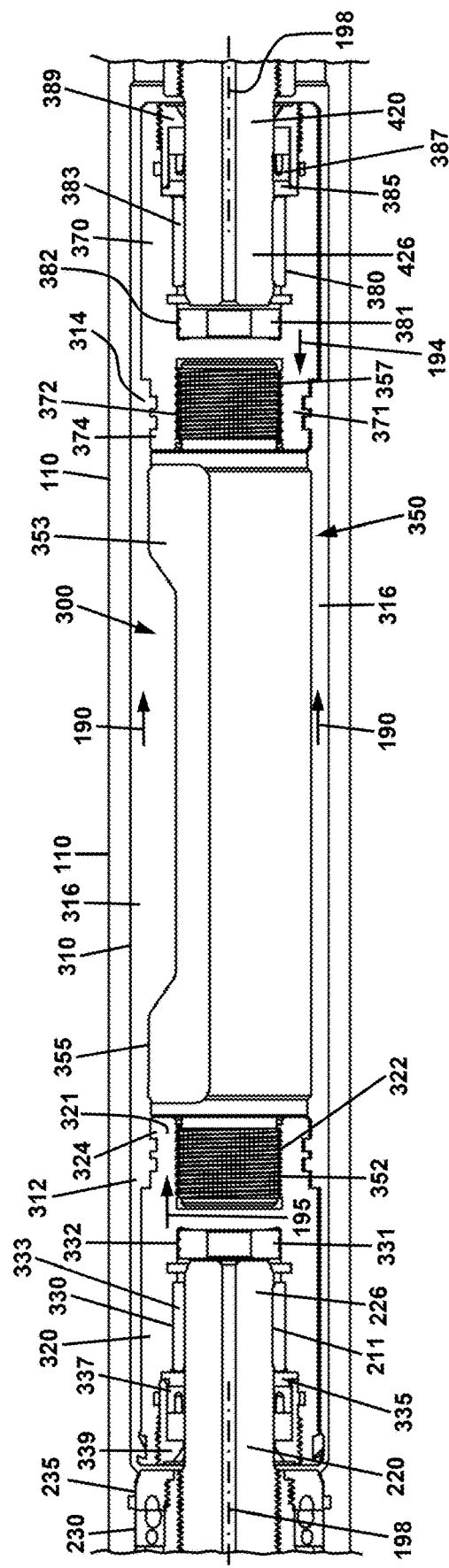
Figure 7C:
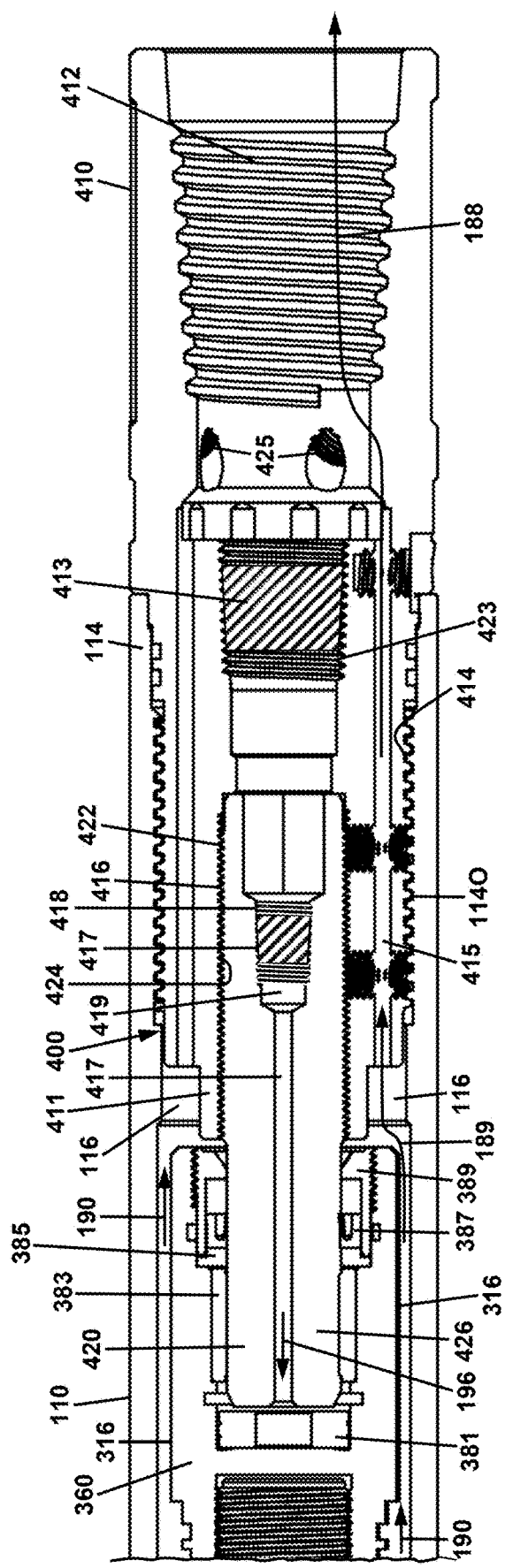

Referring to FIGS. 5, 6, and 7C, the outlet subassembly 400 is comprised of the bottom housing sub or outlet housing 410 and the outlet or bottom bearing shaft 420. The outlet housing 410 is comprised of an outlet port which may include outlet threads 412. The outlet threads 412 may be engaged with outlet tubing 72 (FIG. 9B) for connection to remote tools (not shown), such as milling tools (e.g., milling tool 500 of FIGS. 2 and 10A), drills, pulling tools, cutting tools, etc. that may be deployed further down the wellbore. Suitable types of outlet tubing 72 include but are not limited to seamed or seamless tubing, jointed pipe, production tubing, snubbing pipe, coil tubing, and casing.

The outlet housing 410 is further comprised of external threaded region 414, which is engaged with corresponding outlet threads 1140 of housing 110 when the device 100 is fully assembled. The outlet housing 410 is further comprised of an internal threaded region 416 which is engaged with corresponding threads 424 on the proximal end 422 of the lower or bottom bearing shaft 420. The distal end 426 of the lower bearing shaft 420 extends outwardly from the distal end 411 of the outlet housing 410 in a cantilevered arrangement so as to be able to engage with a bearing housing bottom sub 360 of the sonic drive subassembly 300 as will be explained subsequently.

In certain cases, the inlet housing 210 and the outlet housing 410 may be made as identical parts. However, within the overall device 100, the inlet housing 210 and the outlet housing 410 are configured differently. The inlet housing 210 contains a pulsation valve assembly 250, the structure and function of which will be explained subsequently, while the outlet housing 410 contains a threaded plug 413 in the corresponding location. Alternatively, the outlet housing 410 may contain another device, such as a back pressure valve (not shown).

Referring to FIGS. 5, 6, and 7B, the sonic drive subassembly 300 is comprised of a sonic drive 350, a bearing housing top sub 320, a bearing housing bottom sub 370, and a grease reservoir cover or sleeve 310. (It is noted that in FIGS. 5 and 7B, all of the respective parts are shown in a cross sectional view except for the sonic drive 350, which is shown in its entirety.) The sonic drive 350 is comprised of threaded extensions 352 and 357 that extend outwardly in an axial direction from a central bar 355.

The threaded extension 352 of the sonic drive 350 is engaged with corresponding threads 322 in a central cavity formed in the top sub 320, thereby joining the sonic drive 350 to the top sub 320. The threaded extension 357 of the sonic drive 350 is engaged with corresponding threads 372 in a central cavity formed in the bottom sub 370, thereby joining the sonic drive 350 to the bottom sub 370. The grease reservoir cover 310 surrounds the sonic drive 350. The respective inlet and outlet ends 312 and 314 of the grease reservoir cover 310 are joined to and sealed with the inner ends 324 and 374 of the grease reservoir cover 310. The entire sonic drive subassembly 300 comprised of sonic drive 350, a top sub 320, and bottom sub 370 is rotatable within the elongated tubular housing 110 as will be described subsequently.

The sonic drive 350 is preferably made of a dense material, such as a metal. In one case, the sonic drive is made of lead. Other dense metals, such as dense transition metals, may be suitable. Additionally, the central bar 355 of the sonic drive 350 is asymmetric with respect to the rotational axis 198 of the sonic drive, which is defined by the respective engagements of the threaded extension 352 with the threads 322 of the top sub 320 and the threaded extension 357 with the threads 372 of the bottom sub 370. This asymmetry results in the sonic drive 350 being out of balance with respect to its axis of rotation 198. Thus, rotation of the sonic drive 350 within the device 100 results in vibration and rotary oscillation of the device 100, as will be explained in further detail herein.

In the case depicted in FIGS. 5 and 7B, the asymmetry of the sonic drive 350 is provided by forming elongated cavities 351 and 356 in the central bar 355, separated by a support fin 353. The amount of metal that is removed to form cavities 351 and 356, thereby placing the sonic drive 350 out of balance determines the impact force of the device 100 on the walls of the production tubing 18 and upon an obstruction 8 in the tubing. In other cases (not shown), the weight of the sonic drive 350 may be increased by adding metal plates to the area where metal was originally removed. In adding additional metal plates to increase the weight, screws may attach the metal plates to the sonic drive 350. Other asymmetric configurations are contemplated.

Prior to assembly of the overall device 100, the inlet subassembly 200, the sonic drive subassembly 300, and the outlet subassembly 400 may be assembled separately. Assembly of the device 100 will now be described. It is to be understood that the order of the steps of assembling the device 100 may vary from the order described here, while still achieving the same result of an assembled device 100.

Figure 8A:
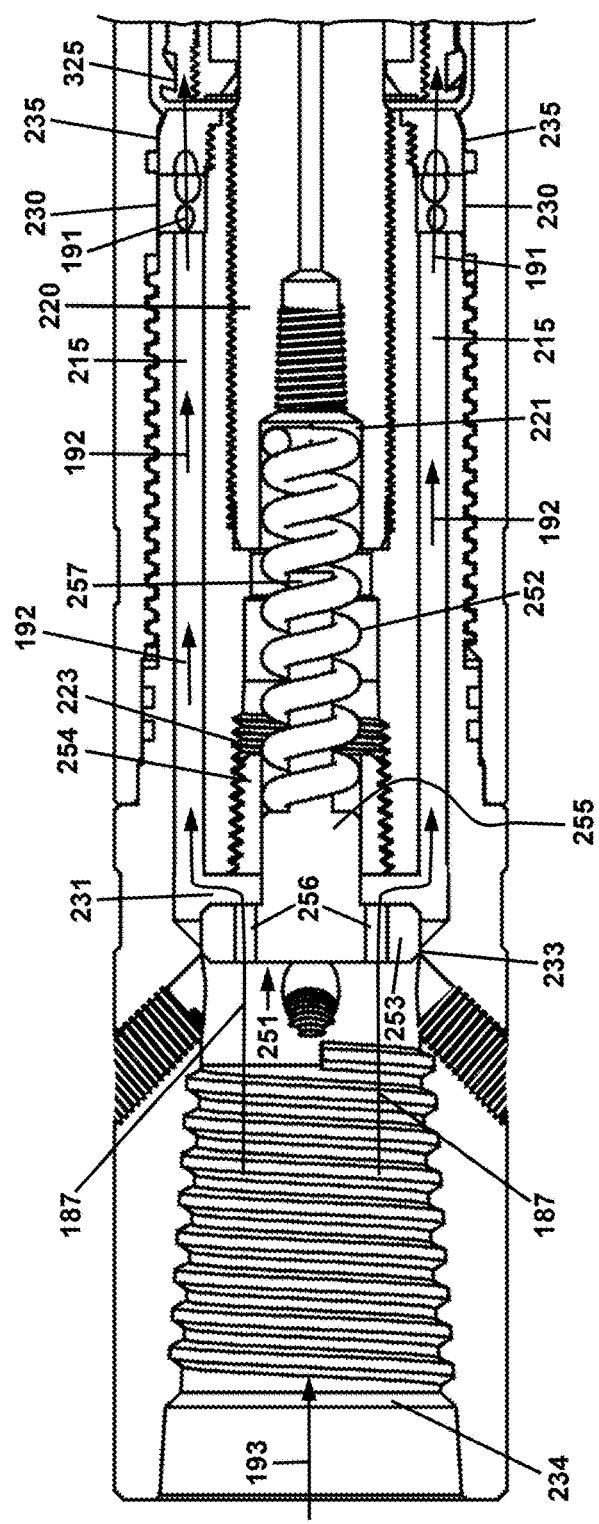
FIG. 8A is a detailed cross-sectional view of a pulsation valve assembly of the device shown in a first operational position.
Figure 8B:
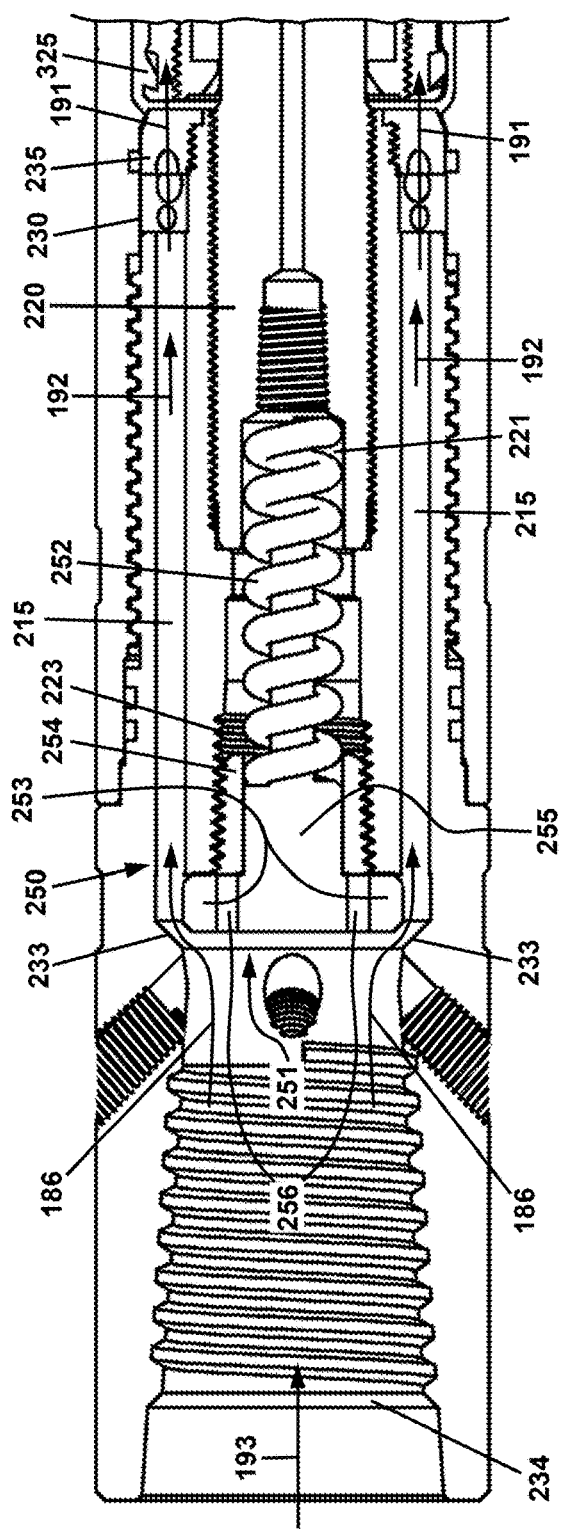
FIG. 8B is a detailed cross-sectional view of the pulsation valve assembly of the device shown in a second operational position.
Figure 9:
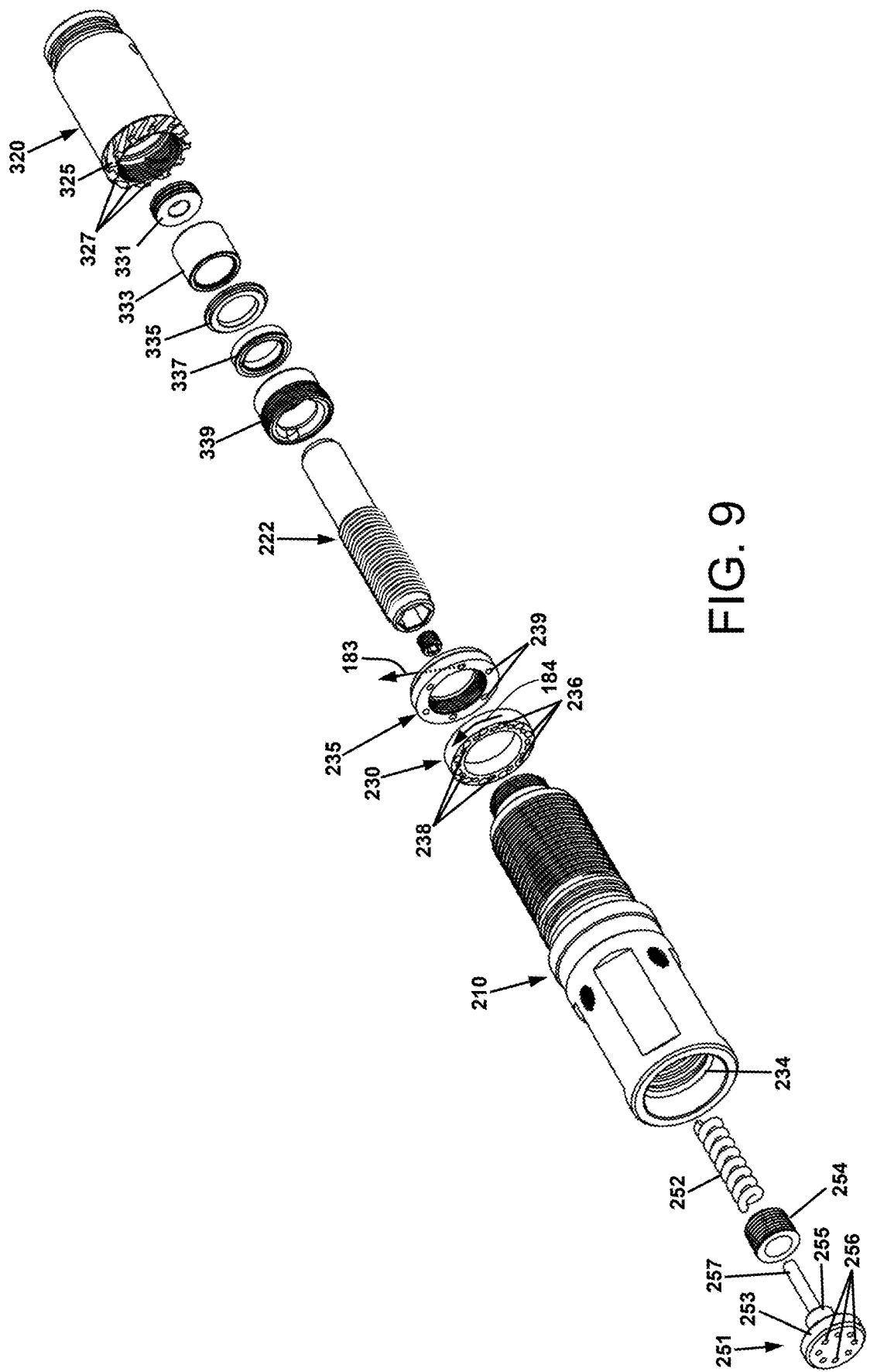
FIG. 9 is an exploded perspective view of components of the tubing obstruction removal device that cause rotation of a sonic drive assembly of the device.

Referring to FIG. 7A, to assemble the inlet subassembly 200, the threads 224 of the upper bearing shaft 220 are engaged with the threads 216 of the inlet housing 210 until the upper bearing shaft 220 is seated tightly in the inlet housing 210. The variable frequency drive plate 230 is disposed on the shoulder 228 of the inlet housing 210, and the fluid jet propulsion plate 235 is engaged with threads 227 of the inlet housing 210 and tightened until it is contiguous with and holds the variable frequency drive plate 230 in place on the inlet housing 210. Referring also to FIGS. 8A and 8B, a spring 252 of the valve assembly 250 is disposed in a central cavity 221 of the upper bearing shaft 220. An alignment bushing 254 is threaded into a corresponding threaded central cavity 223 of the inlet housing 210. A pulsation valve member 251 comprising a pulsation plate 253, a guide portion 255, and an elongated rod 257 is fitted such that the guide portion 255 is in a sliding fit in a central passage in the bushing 254 and the elongated rod 257 extends within the spring 252.

Referring to FIG. 7C, to assemble the outlet subassembly 400, the threads 424 of the upper bearing shaft 420 are engaged with the threads 416 of the outlet housing 410 until the upper bearing shaft 420 is seated tightly in the inlet housing 410. After a lubricating grease is applied to the outlet housing 410 (to be described subsequently), the sealing plug 413 is threaded into a corresponding threaded central cavity 423 of the outlet housing 410.

Referring to FIG. 7B, to assemble the sonic drive subassembly 300, an upper thrust bearing 331 is disposed in an inner portion 332 of a central cavity 330 in the bearing housing top sub 320. A bearing 333, such as a needle bearing or a bushing, is fitted into a middle portion of the central cavity 330. A seal washer 335 and a high pressure seal 337 are fitted into an outer portion of the central cavity 330. A bearing seal nut 339 is engaged by threads with the outer portion of the central cavity 330, thereby retaining the upper thrust bearing 331, bearing 333, seal washer 335 and high pressure seal 337 in place for further assembly steps.

Referring again to FIG. 7B, a lower thrust bearing 381 is disposed in an inner portion 382 of a central cavity 380 in the bearing housing bottom sub 370. A bearing 383 is fitted into a middle portion of the central cavity 380. A seal washer 385 and a high pressure seal 387 are fitted into an outer portion of the central cavity 380. A bearing seal nut 389 is engaged by threads with the outer portion of the central cavity 380, thereby retaining the upper thrust bearing 381, bearing 383, seal washer 385 and high pressure seal 387 in place for further assembly steps. In certain cases, the seal washer 385 may have grooves (not shown) cut into the face thereof, facing the high pressure seal 387. These grooves function to stop the high pressure seal 387 from rotating when the device 100 is being operated. The seal washer 385 also keeps the upper bearing shaft 220 in coaxial alignment during operation of the device 100. The seal washer 385 is held in place by the bearing seal nut 389.

Referring again to FIG. 7B, the central bar 355 is disposed inside of the grease reservoir cover 310. The bearing housing top sub 320 with assembled seal and bearings is fitted to the inlet end 312 of the grease reservoir cover 310, and the threads 352 of the sonic drive 350 are engaged with the threads 322 of the bearing housing top sub 320. The bearing housing bottom sub 370 with assembled seal and bearings is fitted to the outlet end 314 of the grease reservoir cover 310, and the threads 357 of the sonic drive 350 are engaged with the threads 372 of the bearing housing bottom sub 370.

At this point, the steps of assembling the inlet subassembly 200, the sonic drive subassembly 300, and the outlet subassembly 400 are substantially complete. Minor further adjustments may be performed. The assembling of the subassemblies 200, 300, and 400 to compete the assembly of the device 100 may then performed as follows.

The sonic drive subassembly 300 is inserted into the elongated tubular housing 110. The distal end 226 of the upper bearing shaft 220 is inserted into the upper end 112 of the elongated tubular housing 110. The distal end 426 of the lower bearing shaft 420 is inserted into the lower end 114 of the elongated tubular housing 110. The external threaded region 214 of the inlet housing 210 of the inlet subassembly 200 is engaged with corresponding inlet threads 1141 of the elongated tubular housing 110. The external threaded region 414 of the outlet housing 410 of the outlet subassembly 400 is engaged with corresponding outlet threads 1140 of the elongated tubular housing 110. The screwing of the housings 210 and 410 into the elongated tubular housing 110 advances the housings 210 and 410 until they are fully seated in the elongated tubular housing 110 as shown in FIGS. 5-7C. Additionally, because the inlet subassembly 200, the sonic drive subassembly 300, and the outlet subassembly 400 all share a common central axis 199 (FIG. 3), the screwing of the housing 210 into the elongated tubular housing 110 advances the distal end 226 of the upper bearing shaft 220 until it extends through the bearing seal nut 339, high pressure seal 337, seal washer 335, and bearing 333, and is seated against the upper thrust bearing 331. In like manner, the screwing of the housing 410 into the elongated tubular housing 110 advances the distal end 426 of the lower bearing shaft 420 until it extends through the bearing seal nut 389, high pressure seal 387, seal washer 385, and bearing 383, and is seated against the lower thrust bearing 381. The portions of the upper bearing shaft 220 and lower bearing shaft 420 may be polished at the locations where they are in contact with the respective bearings and seals.

At this point, the assembly of the device 100 is substantially complete. Minor further adjustments and/or lubrication steps may be performed. It is noted that with the assembly of the device completed, the sonic drive assembly 300, which includes the sonic drive 350, the bearing housing top sub 320, the bearing housing bottom sub 370, and the grease reservoir cover 310, is fully rotatable within the elongated tubular housing 110. Such rotation is caused by delivering high pressure liquid through the device 100 as will be described subsequently.

In order to achieve reliable operation of the obstruction removal device 100, certain lubrication provisions are provided in the device 100. The provisions enable the delivery of grease through the bearing shafts 220 and 420, and further into the sonic drive assembly 300 without having to disassemble the obstruction removal device 100. These provisions are best understood with reference to FIGS. 5-7C, and will now be described.

Prior to installation of the pulsation valve assembly 250 in the inlet housing 210, or with the pulsation valve assembly 250 temporarily removed, a shaft grease plug 217 is removed from a threaded port 218 in the upper bearing shaft 220. A grease delivery tool (not shown) is connected to the grease port 218. The delivery tool forces grease into the grease port 218 and through a grease delivery passageway 219 in the upper bearing shaft 220 as indicated by arrow 197. The grease may flow further around and/or through the thrust bearing 331, and enter a grease passageway 321 that is in fluid communication with running clearances between the sonic drive 350 and the grease reservoir cover 310 as indicated by arrow 195.

In like manner, a shaft grease plug 417 is removed from a threaded port 418 in the lower bearing shaft 420. The grease delivery tool (not shown) is connected to the grease port 419. The delivery tool forces grease into the grease port 418 and through a grease delivery passageway 419 in the lower bearing shaft 420 as indicated by arrow 196. The grease may flow further around and/or through the thrust bearing 381, and enter a grease passageway 371 that is in fluid communication with running clearances between the sonic drive 350 and the grease reservoir cover 310 as indicated by arrow 194.

The grease that is delivered though the running clearances between the sonic drive 350 and the grease reservoir cover 310 may fill all or part of the elongated cavities 351 and 356 in the central bar 355. In that manner, the cavities function as grease reservoirs, in addition to providing the out-of-balance property of the sonic drive 350 described previously.

In an alternative or additional lubrication procedure, prior to joining the inlet subassembly 200 to the sonic drive subassembly 300, the empty central cavity 330 in the bearing housing top sub 320 may be packed with grease. Then, as the upper bearing shaft 220 slides into the central cavity 330 when assembling the inlet subassembly 200 to the sonic drive subassembly 300, the excess grease is vented through the grease delivery passageway 219 and the grease port 218. In like manner, the empty central cavity 380 in the bearing housing bottom sub 370 may be packed with grease. Then, as the lower bearing shaft 420 slides into the central cavity 380 when assembling the outlet subassembly 400 to the sonic drive subassembly 300, the excess grease is vented through the grease delivery passageway 419 and the grease port 418. When the lubrication procedure is completed, the grease plugs 217 and 417 can be reinstalled in the respective upper and lower bearing shafts 220 and 420.

It is noted that the high pressure seals 337 and 387 prevent the internal bearing grease from escaping the inlet subassembly 200, the sonic drive subassembly 300, and the outlet subassembly 400. The high pressure seals 337 and 387 also prevent high pressure drive fluids delivered through the device from entering into the bearing and grease areas and contaminating the grease in the inlet subassembly 200, the sonic drive subassembly 300, and the outlet subassembly 400.

It is further noted that in operation of the device 100, when the sonic drive 350 is rotating, the grease reservoir cover 310 protects the sonic drive 350 from drive fluids, debris, trash, sand and other abrasive and/or corrosive materials. Additionally, grease that is stored within the grease reservoir cover 310 in the elongated cavities 351 and 356 in the central bar 355 undergoes a centrifugal force that forces the grease toward the inner wall of the grease reservoir cover 310, and back through the grease passageways 321 and 371 counter to the direction of arrows 195 and 194, and to the bearings 331, 333, 381, 383, and the seals 337 and 387.

The operation of the device 100 by forcing a drive fluid through the device 100 will now be described with reference in particular to FIGS. 6-8B. In one case, the drive fluid may be water.

The drive fluid (not shown) may be delivered to the device 100 from a pump (not shown) located at ground level 4, which delivers the drive fluid at a high pressure. The drive fluid enters the device 100 through the inlet housing 210 as indicated by arrow 193. The drive fluid flows through the pulsation valve assembly 250, the components of which operate to cause the drive fluid to exit the pulsation valve assembly 250 in pulses of high pressure fluid as will be described subsequently. The drive fluid flows through the ports 215 in the inlet housing 210 as indicated by arrows 192. The drive fluid then flows through the variable frequency drive plate 230 and the fluid jet propulsion plate 235, impinging upon a turbine 325 formed at the outer end of the top sub 320. The turbine 325 may be comprised of grooves (not shown) or fins 327 (FIG. 9) that are formed on the outer end of the top sub 320. The grooves are cut at an angle such that the fluid is directed radially outwardly when passing through the grooves. The impingement of the high pressure fluid upon the turbine 325 causes the top sub 320 to rotate, and therefore the entire sonic drive subassembly 300 comprised of the sonic drive 350, the bearing housing bottom sub 370, and the grease reservoir cover 310 to rotate. The rotation of the sonic drive 350 is unbalanced and causes the device 100 to oscillate within the production tubing 18 as described previously.

The drive fluid exits the turbine 325 and flows through an annular gap 316 between the grease reservoir cover 310 and the elongated tubular housing 110 as indicated by arrows 190. The drive fluid exits the annular gap 316, flows through an annulus 116 formed between the elongated tubular housing 110 and the distal end 411 of the outlet housing 410, and through a port 415 in the outlet housing 410 as indicated by arrow 189. The drive fluid exits the port 415, and flows out of the outlet housing 410 as indicated by arrow 188.

In certain cases, the device 100 may include reverse flow fluid jets, which direct some of the drive fluid out of the device 100, and rearwardly, counter to the direction that the device 100 is being advanced in the production tubing 18. Referring to FIGS. 5-7A, reverse flow ports 225 are provided in the inlet housing 210. The ports 225 are directed rearwardly. Threaded plugs 213 are shown, fitted into the ports 225 to seal them. The plugs 213 may be replaced with orifices (not shown), which provide reverse flow fluid jets (not shown) when the device 100 is in operation. The reverse flow can be advantageous in that it flushes fragmented obstruction debris backwardly out through the production tubing. The reverse flow can also provide a forward propulsion force, helping to advance the device 100 forwardly though the production tubing 18.

In certain cases, the device 100 may include forward flow fluid jets, which direct some of the drive fluid out of the device 100, radially outwardly and forwardly in the direction that the device 100 is being advanced in the production tubing 18.

Referring to FIGS. 5, 6, and 7C, forward flow ports 425 are provided in the outlet housing 410. The ports 425 are directed forwardly. Threaded plugs (not shown) are fitted into the ports 425 to seal them. The plugs may be replaced with orifices (not shown), which provide forward flow fluid jets (not shown) when the device 100 is in operation. The forward flow at an outward angle can be advantageous in that it flushes fragmented obstruction debris away from a tool bit 500 (FIGS. 2 and 9) that is mounted on the distal end of the device 100.

The operation of the pulsation valve assembly 250, the variable frequency drive plate 230, and the fluid jet propulsion plate 235 to cause rotation of the sonic drive assembly 300 will now be described in further detail. These components function in a manner that amplifies the intensity of the oscillation of the device 100 when it is in operation. These components are best understood with reference to FIGS. 8A-9.

The pulsation valve assembly 250 is comprised of a spring 252, a pulsation valve member 251, and an alignment bushing 254. The spring 252 of the valve assembly 250 is disposed in a central cavity 221 of the upper bearing shaft 220. The alignment bushing 254 is threaded into a corresponding threaded central cavity 223 of the inlet housing 210. The pulsation valve member 251 is comprised of a pulsation plate 253, and a guide portion 255. Additionally, the pulsation valve member 251 may include an elongated rod 257. The pulsation valve member is fitted such that the guide portion 255 is in a sliding fit in a central passage in the bushing 254. The elongated rod 257, if provided, extends within the spring 252.

In operation of the device 100, when the pulsation valve member 251 is forced by the spring 252 outwardly into the closed position as shown in FIG. 8A, the drive fluid flows through orifices 256 in the pulsation plate 253, and on into a plurality of drive fluid ports 215 provided in the inlet housing 210 as indicated by arrows 187. The plurality of drive fluid ports 215 are distributed radially around the threaded central cavity 223. The ports 215 are in fluid communication with a water diversion chamber or annulus 231 that is present when the pulsation valve member 251 is in the open position. Additionally, the orifices 256 are of a predetermined diameter so as to result in the desired oscillating of the pulsation valve member 251 back and forth from the open position to the closed position, as will be explained presently. The orifices 256 may also be arranged in a smaller circular pattern than the drive fluid ports 215 in the inlet housing 210. When the pulsation valve member 251 is in the open position as shown in FIG. 8B, the flow of drive fluid through the orifices 256 is blocked by the pulsation plate 253 being seated against the inlet housing 210.

In the absence of any flow of drive fluid, the spring 252 maintains the pulsation valve member 251 in the closed position shown in FIG. 8A. When drive fluid is delivered to the device 100, it applies fluid pressure to the pulsation valve member 251, as well as a drag force as the drive fluid flows though the orifices 256 in the pulsation plate 253. When the drive fluid pressure is sufficiently high, the force will become sufficient to compress the spring 252. The full extent of compression of the spring 252 occurs when the pulsation valve member 251 in the open position shown in FIG. 8B. Because the relative amount of compression of the spring 252 is relatively small relative to its overall length, in some cases, the spring 252 can be considered as applying a substantially constant resisting force in the transition from the closed position to the open position, Hooke's law notwithstanding.

When drive fluid is delivered to the device, the orifices 256 in the pulsation plate 253 meter a predetermined flow rate of drive fluid to flow through the orifices 256 and into the drive fluid ports 215. As the pressure and flow rate of drive fluid is increased, at a certain threshold pressure, pulsation plate 253 cannot relieve the fluid pressure in the inlet cavity 234 of the inlet housing by passing sufficient flow through the orifices 256 and around the bypass pathway. At that point, the force from fluid pressure on the outer surface of the pulsation plate 253 and the drag force of the drive fluid flowing through the orifices 256 exceeds a threshold force, and thus the spring 252 begins to compress and decrease in length, and the pulsation valve member 251 begins to transition to the open position. When the pulsation valve member 251 begins the transition from the closed position as shown in FIG. 8A, moving inwardly to a partially open position, the outer perimeter edge of the pulsation plate 253 begins to separate from the inner wall 233 of the inlet housing 210, thereby opening an annular gap between the outer edge of the pulsation plate 253 and the inner wall 233 of the inlet housing 210. When the pulsation valve member 251 is in a fully open position as shown in FIG. 8B, the drive fluid bypasses the pulsation plate 253 by flowing around its outer perimeter, and into the drive fluid ports as indicated by arrows 186. The outer perimeter of the pulsation plate 253 may be provided with a beveled edge so that the drive fluid can more easily bypass the pulsation plate 253.

When the pulsation valve member 251 is in the closed position of FIG. 8A, thereby blocking the bypass flow, only the orifices 256 pass drive fluid. Under such a flow restriction, the flow of drive fluid through the drive fluid ports 215 and onward through the sonic drive subassembly 300 causes the sonic drive 350 to rotate at a relatively slow rotational rate.

However, above a threshold inlet fluid pressure, the pulsation valve member 251 transitions from the closed position as shown in FIG. 8A, to the open position shown in FIG. 8B. When the pulsation valve member 251 fully opens, the drive fluid flow rate increases, thereby rapidly causing the sonic drive 350 to accelerate at a high rotational rate. This opening of the flow path acts as pressure relief; accordingly, the pressure of the drive fluid in the inlet cavity 234 upstream from the pulsation valve member 251 decreases. This reduction of pressure causes the pulsation valve member 251 to revert to the closed position as shown in FIG. 8A. Thus, thus the pulsation valve member 251 oscillates between the open and closed position, thereby causing a pulsation in the drive fluid flow to the sonic drive 350, which in turn causes the sonic drive 350 to oscillate between a low rotational rate and a high rotational rate.

Because the sonic drive 350 is dimensioned to result in out of balance rotation, this oscillation of the rotational rate of the sonic drive 350 results in variable frequency shock waves being transmitted out through the inlet and outlet housings, and through a tool bit that is joined to the device (e.g., milling tool 500 of FIGS. 2 and 10A), and to any nearby parts such as a bottom hole assembly (not shown) that is located in the production tubing 18.

In certain cases, the features of the pulsation valve member 251 and the inlet housing 210 may be dimensioned such that the flow rate of drive fluid through the device 100 when the pulsation valve member 251 is in the closed position is about 50% of the flow rate when the pulsation valve member 251 is in the open position. The frequency of oscillation of the pulsation valve member 251 between the open and closed position may be changed by changing the diameter of the orifices 256 in the pulsation plate 253, or by selecting a spring 252 with a higher or lower spring constant. In certain cases, the frequency of oscillation of the pulsation valve member 251 may be between about 150 and about 2000 Hz.

Referring again to FIGS. 5-9, in certain cases, the device 100 may include a variable frequency drive plate (VFDP) 230 and a water jet propulsion plate (WJPP) 235, which are located on the input housing 210 immediately upstream of the turbine 325 on the top sub 320. The VFDP 230 is dimensioned to be a sliding fit on the input housing 210, and to have axial clearance with the input housing 220 and the WJPP 235, so that the VFDP 230 is freely rotatable on the input housing 210. The VDFP is preferably made of a hard material such as but not limited to a hardened steel, a metal coated with a hard material such as titanium nitride, or a hard ceramic such as titanium carbide.

The VFDP 230 is provided with a plurality of angled orifices therethrough. The orifices may be of different diameters. In the case depicted in FIG. 9, the VFDP 230 is provided with large orifices 236 and small orifices 238. With respect to the view point of FIG. 9, the orifices 236 and 238 are angled clockwise. Thus, when the device 100 is in operation, the ejection of drive fluid out of the orifices 236 and 238 results in tangential forces on the VFDP 230, which cause the VFDP 230 to rotate counterclockwise as indicated by arrow 184.

The water jet propulsion plate 235 is mounted on the input housing 210 by an interference fit, so that it is joined thereto, and does not rotate. The WJPP 235 is provided with orifices 239 that are angled so as to optimize the angle of ejection of drive fluid therefrom with respect to the blades of the turbine 325. In the case depicted in FIG. 9, the orifices are angled counterclockwise, so that the drive fluid is ejected from the WJPP 235 in a tangential direction as indicated by arrow 183. The direction of ejection of the drive fluid from the WJPP 235 may be substantially perpendicular to the faces of the fins 327 of the turbine 325. In that manner, the maximum force of the flowing drive fluid is applied to the fins 327 of the turbine 325. The diameter, angle, and/or arrangement of the orifices 239 in the WJPP 235 may be modified to result in the sonic drive 350 turning at different speeds, thereby causing higher or lower frequency shockwaves.

The VFDP 230 and the WJPP 235 are dimensioned and positioned such that there is minimal clearance between them. There is substantially no leakage of drive fluid between their contiguous surfaces. As the VFDP 230 rotates, the orifices 236 and 238 thereof alternatingly become aligned and unaligned with the orifices 239 in the WJPP 235. As the sonic drive 350 rotates, the resulting frequency shockwaves described previously facilitate the rotation of the VFDP 230. The VFDP 230, as it rotates, changes the frequency of the shockwave. The range of shockwave frequencies modulated by the VFDP 230 may be varied by changing the diameter of the orifices 256 in the pulsation valve member 251, or by selecting a spring 252 of the pulsation valve assembly 250 with a higher or lower spring constant.

Referring again to FIGS. 3-6, in summary, the obstruction removal device 100 is comprised of the housing 110, the inlet subassembly 200, the sonic drive subassembly 300 including a sonic drive 350, and the outlet subassembly 400. The pulsation valve assembly 250 contained within the inlet housing 210 is operable to receive a steady inlet flow of high pressure fluid along a longitudinal axis of the housing, and discharge intermittent high frequency pulses of high pressure fluid along the longitudinal axis of the housing. The sonic drive 350 is disposed in the housing 110 and suspended by a top bearing 333 and a bottom bearing 383. The sonic drive 350 is asymmetric with respect to the longitudinal axis of the device 100, rotatable within the housing 110, and operable to receive the intermittent high frequency pulses of high velocity fluid, and to convert the axial momentum of the intermittent high frequency pulses of high velocity fluid to unbalanced rotary motion of the sonic drive 350.

Figure 10A:
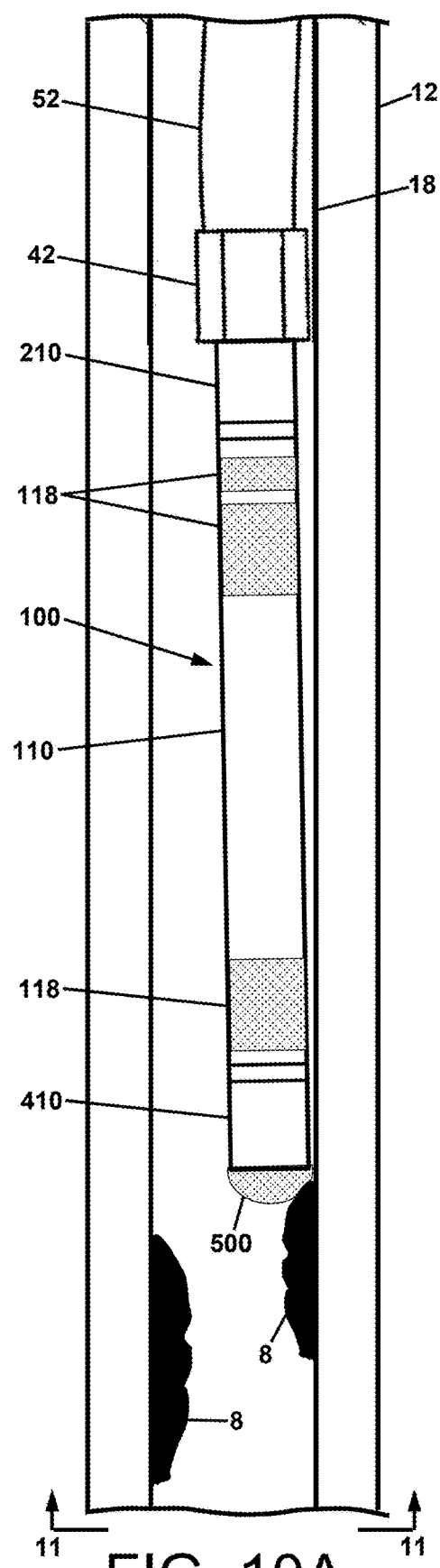
FIG. 10A is a schematic diagram of the device of FIG. 3 shown with a tool bit attached to a distal end of the device, in the act of cleaning a wellbore.
Figure 10B:
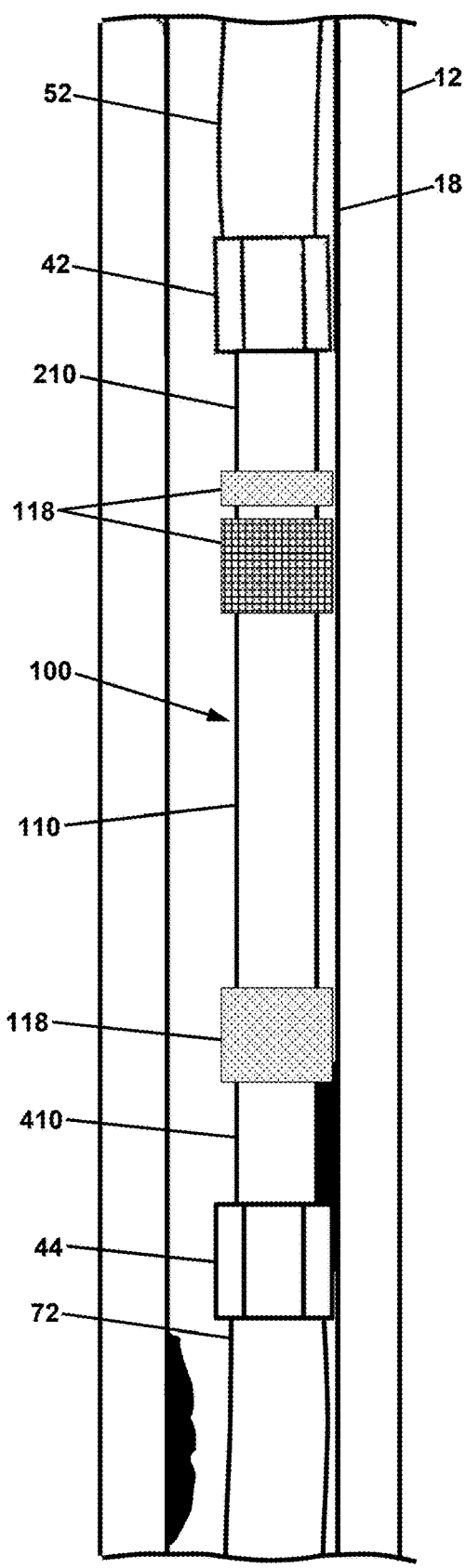
FIG. 10B is a schematic diagram of the device of FIG. 3 shown with an outlet tubing string attached to a distal end of the device, in the act of cleaning a wellbore.
Figure 11:
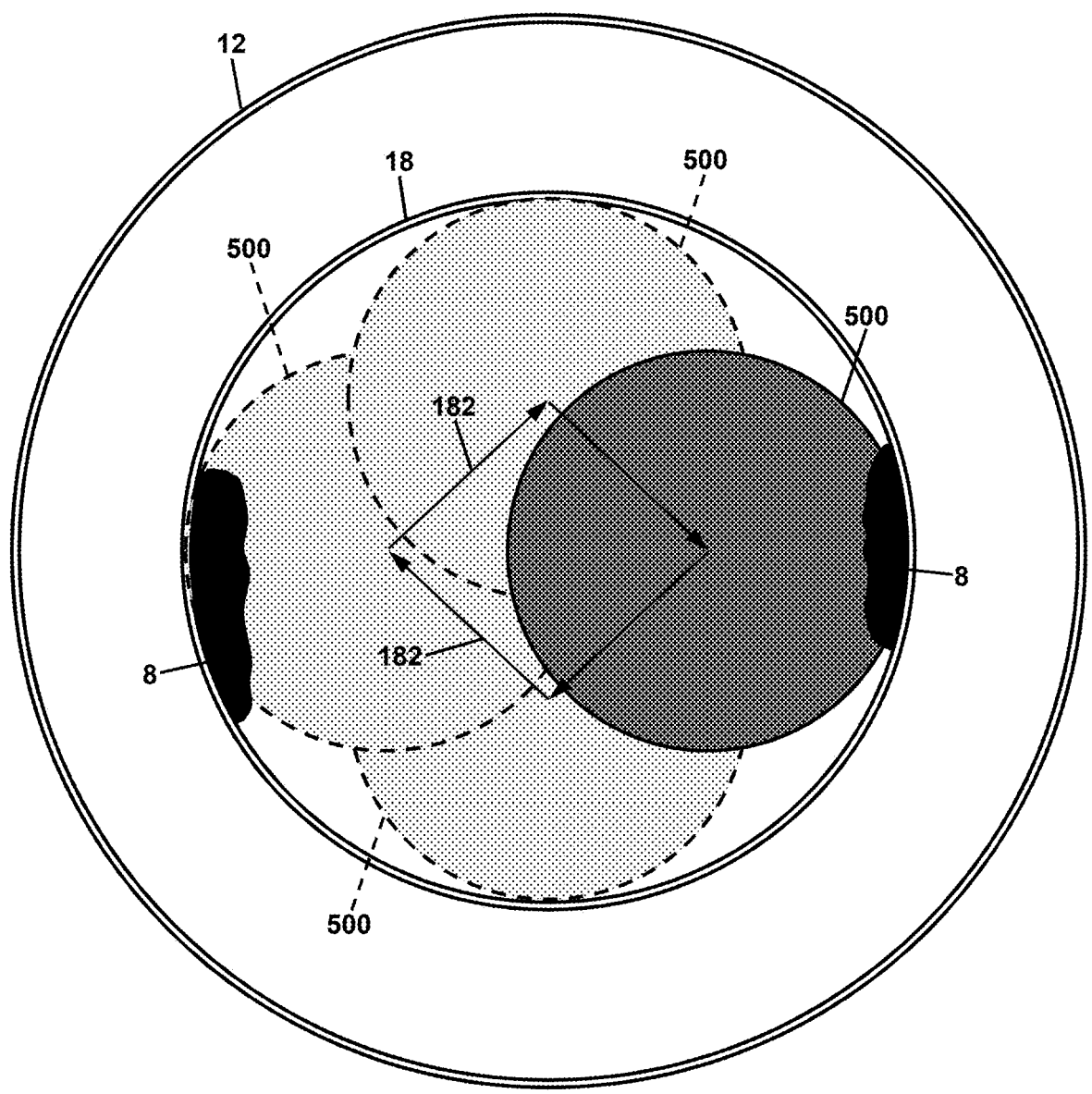
FIG. 11 is an end view of the device of FIG. 9A in the wellbore, taken along line 11 of FIG. 10A.

Referring to FIGS. 10A-11, when the device 100 is deployed within the inner bore of well production tubing 18, the unbalanced rotary motion of the sonic drive 350 causes the device 100 to oscillate with high energy within the inner bore of the production tubing 18, resulting in violent impacts of the inlet housing 210, tubular housing 110, and outlet housing 410 upon the inner bore of the production tubing 18, and any obstruction 8 contained within the production tubing 18. Pipe fittings 42 and 44 that are connected to the device 100 may also impact the inner bore of the production tubing 18. In certain cases, the tubular housing 110 may include knurled regions 118 or regions with abrasives bonded thereto. In that manner, an obstruction 8 within the tubing 18 is disintegrated in the tubing 18. The outflow of drive fluid from the housing further flushes fragments of the obstruction 8 from the tubing 18, resulting in removal of the obstruction 8.

In certain cases, the device 100 may follow linear pathways within the production tubing, i.e., the device ricochets violently along chordal paths within the production tubing to impact the walls thereof. In the exemplary embodiment depicted in FIG. 11, the device 100 with attached milling tool 500 is depicted as following a simple four chord ricochet path as indicated by arrows 182. In other cases, the device 100 may follow much shorter chordal paths, effectively precessing in a 360 degree pattern around the inner bore of the production tubing 18, and scouring an obstruction 18 from the tubing wall. In certain cases, depending upon the pressure and flowrate of the drive fluid, the design of the pulsation valve assembly 250, the mass and moment of inertia of the sonic drive 350, the mass of the overall device 100, and the annular gap between the device 100 and the inner bore of the tubing 18, the obstruction removal device 100 may oscillate or ricochet around the inner bore of the production tubing 18 at a frequency of between 150 and 2000 Hz. In certain cases, the rotational speed of the sonic drive 350 may be between 1000 and 10000 revolutions per minute. In certain cases, the pressure of the drive fluid into the device 100 may be between 800 and 3000 pounds per square inch.

The obstruction removal device 100 of the present disclosure is versatile in terms of the obstructions that it is capable of removing. In certain cases, such as that of FIGS. 2 and 10A, the device 100 may have a milling tool bit 500 having cutting edges of a hard material such as titanium nitride or titanium carbide fitted to the distal end thereof. Such a tool bit 500 is effective in removing hard and abrasive obstructions such as cement, scale, and mineral deposits. In other cases, the device 100 may have a coupling fitting joined to the distal end thereof. The device 100 is then deployed to an obstruction in the form of a stuck tool (not shown), i.e., a fish, and the coupling fitting is connected to the fish. The device 100 is then operated, such that the fish is oscillated along with the device 100. The violent oscillations of the fish, optionally along with some axial force applied by the feed tubing 52 and device 100, free the fish from its stuck position, so that it can be removed from the production tubing 18.

The tubing obstruction removal device 100 and methods of the present disclosure are advantageous over conventional removal devices and methods. In one aspect of the device 100 of the present disclosure, the device 100 is capable of removing obstructions from production tubing using smaller tubing as a conveyance of the device.

In another aspect, the device 100 may be used in conjunction with a jetting tool to clean out tubing in a wellbore.

In another aspect, the device 100, tubing feed unit, and feed tubing 52 provide an assembly that can extend the distance to which the feed tubing 52 and the device 100 can be laterally extended.

In another aspect, the device 100 and a milling tool 500 joined thereto provide an assembly that can mill obstructions in production tubing 18 using coiled tubing as conveyance of the device 100.

In another aspect, the device100 and a milling tool 500 joined thereto provide an assembly that can mill obstructions in production tubing 18 using jointed pipe as conveyance of the device 100.

In another aspect, the device 100 and a coupling tool joined thereto provide an assembly that can generate frequency that can assist in releasing a tool stuck in a wellbore, using either coiled tubing or jointed pipe as conveyance. The use of the assembly may increase the distance that jointed pipe can be extended for the purpose of removing obstructions.

In another aspect, the device 100 may be part of an assembly that can be used to increase penetration rate in drilling operations using tubing or jointed pipe as a conveyance.

In another aspect, the device 100 may be part of an assembly that can provide a fast and reliable system for use with tubing to clean out the production tubing in the wellbore. In particular, the tubing feed unit may be used to convey and operate the device in the production tubing in the wellbore or casing without requiring removal of the production tubing.

In another aspect, the device 100 may be part of an assembly that can be used to mill out bridge plugs or cement in the production tubing. In particular, the device enables the use of diesel fuel or certain other fluids which would otherwise damage a positive displacement motors (PDM), as the power fluid in the milling operations.

In another aspect, the device 100 may be part of an assembly that can be used with tools to latch equipment downhole, and to shift sleeves and other moveable parts.

In another aspect, the device 100 may be part of an assembly that can be used to clean out oil and/or gas pipelines and other tubulars located on or near the surface of ground.

In another aspect, the device 100 may be part of an assembly that can be used to mill cement and other obstructions in a wellbore using tubing or jointed pipe as a conveyance.

In another aspect, the device 100 may be part of a bottom hole assembly (BHA), in which the device is the leading wellbore tool of the BHA.

In another aspect, the device 100 may be part of a tubing string comprised of a bottom hole assembly (BHA), in which the device is disposed between the BHA and the tubing feed unit.

In another aspect, the device 100 is relatively inexpensive to construct, and can be deployed at lower cost and more rapidly to remove obstructions from production tubing, as compared to conventional methods and devices used to address obstruction problems.

EXAMPLE

An exemplary prototype obstruction removal tool was fabricated as described herein, having an outside diameter of 1.687 inches in diameter and about 24 inches long. The device was deployed into a length of production tubing. The prototype device was tested over a range of fluid feed conditions and functioned as described herein, oscillating with high energy impacts within the inner bore of the production tubing. The device was used to mill cement obstructions from the tubing. The device was configured as the lead tool on a BHA. It was discovered that when a downward force of as much as 4000 lbs. was applied to the BHA, the device worked better in removing cement obstructions than when lesser or no force was applied. Advantageously, by adding extra axial force, it enabled the device, with a milling tool joined to the distal end thereof, to cut the cement faster.

It is therefore apparent that there has been provided, in accordance with the present disclosure, an apparatus and methods for removing obstructions from hydrocarbon well production tubing. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom. The following definitions and non-limiting guidelines must be considered in reviewing the description.

The headings in this disclosure (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

To the extent that other references may contain similar information in the Background herein, said statements do not constitute an admission that those references are prior art or have any relevance to the patentability of the technology disclosed herein. Any discussion in the Background is intended merely to provide a general summary of assertions.

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

To the extent employed herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Unless otherwise specified, relational terms used in the present disclosure should be construed to include certain tolerances that those skilled in the art would recognize as providing equivalent functionality. By way of example, the term perpendicular is not necessarily limited to 90.00°, but also to any variation thereof that those skilled in the art would recognize as providing equivalent functionality for the purposes described for the relevant member or element. Terms such as "about" and "substantially" in the context of configuration relate generally to disposition, location, and/or configuration that is either exact or sufficiently close to the location, disposition, or configuration of the relevant element to preserve operability of the element within the invention while not materially modifying the invention. Similarly, unless specifically specified or clear from its context, numerical values should be construed to include certain tolerances that those skilled in the art would recognize as having negligible importance, as such do not materially change the operability of the invention.

Similarly, the terms "can" and "may" and their variants are intended to be non-limiting, such that recitation that an embodiment can or may comprise certain elements or features does not exclude other embodiments of the present technology that do not contain those elements or features. Unless noted otherwise, the apparatus for removing obstructions from hydrocarbon well production tubing and hydrocarbon processing tubing disclosed herein encompasses all combinations of the disclosed features thereof, regardless of whether each possible combination of features defining an apparatus has been explicitly recited.

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are also explicitly disclosed herein and are part of this disclosure. An example of "consisting essentially of" may be with respect to the composition of a conduit: a conduit consisting essentially of carbon steel means there may be a minor portions or trace amounts of metals, oxides, and other chemical species that are noble metals, such chromium, platinum, and the like, and a conduit consisting essentially of noble metal may have trace amounts of iron, iron oxides, carbon, and other metal oxides. An example of "consisting of" may be a burner made up of components that are one or more carbon steels and no noble metals or ceramic materials, or conduits made up of only noble metals. Another example of "consisting essentially of" may be with respect to particulate feedstock that consists essentially of inorganic feedstock, meaning that a minor portion, perhaps up to 10, or up to 5, or up to 4, or up to 3, or up to 2, or up to 1 wt. percent may be organic. An example of methods and systems using the transition phrase "consisting of" includes those where only burners having liquid-cooled jackets are used, with no gas-cooled jackets, or vice versa. The term "comprising" and derivatives thereof is not intended to exclude the presence of any additional component, step or procedure, whether or not the same is disclosed herein. In order to avoid any doubt, all compositions, apparatus, systems, and methods claimed herein through use of the term "comprising" may include any additional component, step, or procedure unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting ingredients, components or process steps, the Applicants specifically envision embodiments consisting of, or consisting essentially of, such ingredients, components or processes excluding additional ingredients, components or processes (for consisting of) and excluding additional ingredients, components or processes affecting the novel properties of the embodiment (for consisting essentially of), even though such additional ingredients, components or processes are not explicitly recited in this application. For example, recitation of a composition or process reciting elements A, B, and C specifically envisions embodiments consisting of, and consisting essentially of, A, B, and C, excluding an element D that may be recited in the art, even though element D is not explicitly described as being excluded herein.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

I claim:

1. A tubing obstruction removal device comprising:
   a) a tubular housing;
   b) a valve assembly disposed in an inlet region of the tubular housing and comprising:
      a valve plate in fluid communication with a fluid inlet port of the tubular housing, comprised of a plurality of orifices therethrough, and oscillatable along a longitudinal axis of the tubular housing between a closed position and an open position; and
      a spring in contact with the valve plate and compressible with motion of the valve plate from the closed position to the open position; and
   c) a vibratory drive disposed in the tubular housing and comprising a turbine in fluid communication with the valve assembly and joined to a rotatable bar asymmetric with respect to the longitudinal axis of the tubular housing and rotatable around the longitudinal axis of the tubular housing;

wherein when the valve plate is in the closed position, fluid communication is from the fluid inlet port of the tubular housing through the plurality of orifices in the valve plate, and to the turbine.

2. The tubing obstruction removal device of claim 1, wherein when the valve plate is in the closed position, fluid communication between the fluid inlet port of the tubular housing and the turbine is restricted, relative to fluid communication between the fluid inlet port of the tubular housing and the turbine when the valve plate is in the open position.

3. The tubing obstruction removal device of claim 1, further comprising a fluid jet plate disposed in the tubular housing and in fluid communication with the valve assembly and with the turbine of the vibratory drive.

4. The tubing obstruction removal device of claim 3, wherein the fluid jet plate includes a plurality of orifices angled toward blades of the turbine.

5. The tubing obstruction removal device of claim 3, further comprising a drive plate disposed in the tubular housing and in fluid communication with the valve assembly and with the fluid jet plate.

6. The tubing obstruction removal device of claim 5, wherein the drive plate is rotatable in the tubular housing.

7. The tubing obstruction removal device of claim 6, wherein the drive plate includes a plurality of orifices of a first size interspersed with a plurality of orifices of a second size.

8. A tubing obstruction removal device comprising:
 a) a tubular housing;
 b) a valve assembly disposed in an inlet region of the tubular housing and comprising:
  a valve plate in fluid communication with a fluid inlet port of the tubular housing, comprised of a plurality of orifices therethrough, and oscillatable along a longitudinal axis of the tubular housing between a closed position and an open position; and
  a spring in contact with the valve plate and compressible with motion of the valve plate from the closed position to the open position; and
 c) a vibratory drive disposed in the tubular housing and comprising a turbine in fluid communication with the valve assembly and joined to a rotatable bar asymmetric with respect to a longitudinal axis of the tubular housing and rotatable around the longitudinal axis of the tubular housing;

wherein when the valve plate is in the open position, fluid communication is from the fluid inlet port of the tubular housing around a perimeter of the valve plate, and to the turbine.

9. The tubing obstruction removal device of claim 8, wherein when the valve plate is in the open position, the spring is in a compressed state relative to when the valve plate is in the closed position.

10. A tubing obstruction removal device comprising:
 a) a tubular housing;
 b) a valve assembly disposed in an inlet region of the tubular housing and comprising:
  a valve plate in fluid communication with a fluid inlet port of the tubular housing, and oscillatable along a longitudinal axis of the tubular housing between a closed position and an open position; and
  a spring in contact with the valve plate and compressible with motion of the valve plate from the closed position to the open position;
 c) a vibratory drive disposed in the tubular housing and comprising a turbine in fluid communication with the valve assembly and joined to a rotatable bar asymmetric with respect to a longitudinal axis of the tubular housing and rotatable around the longitudinal axis of the tubular housing:
 d) a fluid jet plate disposed in the tubular housing, in fluid communication with the valve assembly and with the turbine of the vibratory drive; and
 e) a drive plate disposed in and rotatable in the tubular housing, in fluid communication with the valve assembly and with the fluid jet plate, and including a plurality of orifices of a first size interspersed with a plurality of orifices of a second size;

wherein when the valve plate is in the open position, fluid communication is from the fluid inlet port of the tubular housing around a perimeter of the valve plate, and to the turbine;

wherein the valve assembly and drive plate are operable to cause intermittent high frequency pulses of high pressure fluid to the fluid jet plate and to the turbine.

11. The tubing obstruction removal device of claim 10, wherein the plurality of orifices of the first size and the plurality of orifices of the second size are alternatingly in fluid communication with a plurality of orifices in the fluid jet plate.

12. The tubing obstruction removal device of claim 10, wherein the rotatable bar is operable to convert axial momentum of the intermittent high frequency pulses of high pressure fluid to unbalanced rotary motion of the vibratory drive and the tubular housing.

\* \* \* \* \*